United States Patent
Ito et al.

(10) Patent No.: US 7,583,403 B2
(45) Date of Patent: Sep. 1, 2009

(54) IMAGE PROCESSING DEVICE

(75) Inventors: Takeshi Ito, Osaka (JP); Haruo Yamashita, Osaka (JP)

(73) Assignee: Panasonic Corporation, Osaka (JP)

( * ) Notice: Subject to any disclaimer, the term of this patent is extended or adjusted under 35 U.S.C. 154(b) by 777 days.

(21) Appl. No.: 10/527,661

(22) PCT Filed: Sep. 11, 2003

(86) PCT No.: PCT/JP03/11604

§ 371 (c)(1),
(2), (4) Date: Mar. 11, 2005

(87) PCT Pub. No.: WO2004/032524

PCT Pub. Date: Apr. 15, 2004

(65) Prior Publication Data

US 2006/0013478 A1 Jan. 19, 2006

(30) Foreign Application Priority Data

Sep. 12, 2002 (JP) .............................. 2002-266717

(51) Int. Cl.
H04N 1/40 (2006.01)
(52) U.S. Cl. .................... 358/1.9; 358/504; 358/2.1
(58) Field of Classification Search ................ 358/1.9, 358/2.1, 500, 504, 515–523
See application file for complete search history.

(56) References Cited

U.S. PATENT DOCUMENTS 4,768,082 A * 8/1988 Hiratsuka et al. ...... 375/240.01
5,130,935 A 7/1992 Takiguchi
5,384,601 A 1/1995 Yamashita et al.
5,572,599 A * 11/1996 Tse ............................. 382/162
7,034,867 B2 4/2006 Kurokawa (Continued)

FOREIGN PATENT DOCUMENTS

JP 62-281062 A 12/1987

(Continued)

OTHER PUBLICATIONS

International Search Report for PCT/JP2003/011604, dated Jan. 27, 2004 (Japanese with English Translation).

(Continued)

*Primary Examiner*—Thomas D Lee
*Assistant Examiner*—Stephen M Brinich
(74) *Attorney, Agent, or Firm*—RatnerPrestia

(57) ABSTRACT

An image processing apparatus of correcting the color of a specific range of a pixel signal for each pixel included in an input image signal, comprises an intensity determination means of generating a correction intensity that is small on the periphery of the color region of the specific range on the basis of two chromaticity signals excluding a luminance component and large in the vicinity of the nearly central portion of the range in the pixel signal, a target color setting means of setting a target color depending on which the pixel signal is corrected, a correction degree setting means of setting correction degree by also using information, other than pixel information, included in the pixel signal, and a correction means of making the image signal close to the target color depending on the correction intensity output from the intensity determination means and the correction degree output from the correction degree setting means.

26 Claims, 18 Drawing Sheets

U.S. PATENT DOCUMENTS

| | | |
|---|---|---|
| 2002/0008762 A1 | 1/2002 | Takemoto |
| 2002/0041000 A1 | 4/2002 | Watanabe et al. |
| 2002/0097441 A1 | 7/2002 | Hara et al. |

FOREIGN PATENT DOCUMENTS

| | | |
|---|---|---|
| JP | 02-096477 A | 4/1990 |
| JP | 02-309887 A | 12/1990 |
| JP | 06-078320 A | 3/1994 |
| JP | 07-231454 | 8/1995 |
| JP | 07-288836 A | 10/1995 |
| JP | 2000-217127 A | 8/2000 |
| JP | 2001-016605 A | 1/2001 |
| JP | 2001-186323 A | 7/2001 |
| JP | 2001-238128 A | 8/2001 |
| JP | 2002-016939 | 1/2002 |
| JP | 2002-033934 A | 1/2002 |
| JP | 2002-034051 | 1/2002 |
| JP | 2002-041000 A | 2/2002 |
| JP | 2002-218480 A | 8/2002 |
| WO | WO 01/78372 A2 | 10/2001 |

OTHER PUBLICATIONS

International Preliminary Examination Report for PCT/JP03/11604, dated Dec. 9, 2004.

Supplementary European Search Report for PCT/JP0311604 dated Mar. 17, 2009.

* cited by examiner

IMAGE PROCESSING DEVICE

This application is a U.S. national phase application of PCT international application PCT/JP2003/011604.

TECHNICAL FIELD

The present invention relates to an image processing apparatus, an image processing method, a program, a recording medium, a printer apparatus, a television receiver, a projector apparatus, a photographing apparatus and a mobile communication terminal. More particularly, the present invention relates to a memory color correction technology of automatically converting the color in a specific region of an input image signal into a more desirable color. The present invention is widely applicable to output devices, such as a display and a printer, input devices, such as a digital camera and a digital camcorder, and PC application software being used for photographic image databases and retouching.

BACKGROUND ART

In the prior art, there were insufficiencies in the color correction technologies required for numerous full-color devices, such as a camera, a display and a printer, more specifically, the color correction technologies of correcting the inherent characteristics of devices, such as the spectroscopic characteristic of a CCD in a camera and the spectroscopic characteristic of ink in a printer, were being developed, the correction accuracy of the above-mentioned color correction was insufficient. Thus, the technologies conventionally referred to as selective color adjustment and memory color correction were intended to correct improper color reproduction owing to the insufficient accuracy.

The characteristics inherent in the devices have been accurately corrected quantitatively owing to the development of the color correction technology in recent years. Considerably faithful color reproduction has been attained in the sense that the colors quantitatively close to those of an object can be displayed or printed.

However, the use of digital cameras has become widespread and substituted for silver salt analog photographs. High-quality picture technologies that were impossible for analog silver salt photographs have been achieve using technologies of selective color adjustment and memory color correction having target levels higher than previous levels. This is because a camera photographing a natural world is different from a copier wherein faithfulness to manuscripts is important. Displaying on a display and printing on paper are different from photographing an object with respect to physical shape and absolute size, light source and the time of photographing being separate from the time of reproduction. It is known that a quantitatively approximate color is not necessarily sensed to be visually approximate. Hence, for the purpose of displaying and printing a beautiful image that can be obtained only using digital technology, a correction technology for memory colors, such as sky blue, human skin color and the green of trees, becomes important.

However, in the circumstances where quantitatively faithful color reproduction has been attained, how to eliminate the side effects of memory color correction more sufficiently than ever before has become important. More specifically, for example, the following points are important: (1) eliminating influence to regions other than the target to be corrected in terms of memory color, (2) the continuity (no color jumping) of gradation in the directions of luminance, saturation and hue in a memory color region and the boundary between the inside and outside the memory color region, and (3) reducing influence to other objects in the memory color region.

In Japanese Laid-open Patent Application No. Sho 62-281062, the color in the skin color region having the largest number of pixels is corrected to a desirable skin color, wherein the number of pixels in the skin color region of an image is counted and the execution of correction is switched depending on whether the number of pixels in the skin color region exceeds a predetermined value or not. In Japanese Laid-open Patent Application No. Hei 02-96477 and Japanese Laid-open Patent Application No. Hei 06-78320, the correction target region is narrowed with respect to hue and saturation, whereby correction not extended to regions other than the correction region is attained.

The entire disclosures of Japanese Laid-open Patent Application No. Sho 62-281062, Japanese Laid-open Patent Application No. Hei 02-96477 and Japanese Laid-open Patent Application No. Hei 06-78320 are incorporated herein by reference in their entirety.

In Japanese Laid-open Patent Application No. Sho 62-281062, correction/no-correction is switched using the number of pixels in a skin color region; however, when the number of pixels in the skin color region is few, correction is not carried out, and when the number of pixels is large, correction is carried out for the color in the skin color region by the same amount. More specifically, the color judged to be inside the skin color region is subjected to the same amount of correction in the same direction regardless of whether the color is deviated in either direction from the reference color being set empirically. Hence, there is a color that is corrected in a direction opposite to the desirable direction. Such a color becomes discontinuous at the boundary of the region and causes color jumping.

In Japanese Laid-open Patent Application No. Hei 02-96477, a correction region and the weight of correction are calculated according to the product of hue and saturation weighting functions, and hue, saturation and luminance are corrected by the amount proportional to the weight. Color continuity can be maintained by gently setting the weighting function in a wide range. However, the correction direction inside the correction region is still the same direction, and there is a color that is corrected in a direction opposed to the desirable correction direction.

In Japanese Laid-open Patent Application No. Hei 06-78320, a correction region and the weight of correction are calculated using the minimum value of two weighting functions being orthogonal in a chromaticity plane, and the hue, saturation and luminance are shifted by the amount proportional to the weight, whereby it can be expected to have an effect of memory color correction; however, because the correction is carried out in a rectangular region in the chromaticity plane, it is difficult to narrow the regions of skin color and sky blue necessarily and sufficiently; if the effect is exerted, a side effect of correcting colors that should not be changed essentially is caused. In addition, if the size of the rectangular region is made smaller, the influence to colors other than the target color can be avoided, but changes in hue and saturation occurs in the target color, whereby the effect of memory color correction is lost.

The above-mentioned prior art has carry out memory color correction but with side effects. Since the color correction technologies of correcting the inherent characteristics of devices were being developed as described above, the correction accuracy of the above-mentioned color correction was insufficient. The color regions unable to be corrected properly because of such reasons were corrected as a whole in those days.

Hence, a side effect is caused of correcting colors that should not be corrected essentially. In addition, it is inevitable that other objects included in the memory color region that should be corrected essentially but accidentally having colors close to the color to be corrected are corrected. Furthermore, gradation is apt to become discontinuous, and color jumping occurs, whereby image quality degradation may be caused, beyond the effect of memory color correction.

DISCLOSURE OF THE INVENTION

In consideration of the above-mentioned problems, the present invention is intended to provide an image processing apparatus, an image processing method, a program, a recording medium, a printer, a television receiver, a projector apparatus, a photographing apparatus and a mobile communication terminal not causing a side effect of correcting colors that should not be subjected to memory color correction essentially.

Furthermore, in consideration of the above-mentioned problems, the present invention is intended to provide an image processing apparatus, an image processing method, a program, a recording medium, a printer, a television receiver, a projector apparatus, a photographing apparatus and a mobile communication terminal capable of avoiding correcting other objects included in the memory color region that should be corrected essentially but accidentally having colors close to the color to be corrected.

Still further, in consideration of the above-mentioned problems, the present invention is intended to provide an image processing apparatus, an image processing method, a program, a recording medium, a printer, a television receiver, a projector, a photographing apparatus and a mobile communication terminal not making gradation discontinuous and not causing color jumping.

For the purpose of solving the above-mentioned problems, a first aspect of the present invention is an image processing apparatus of correcting the color of a predetermined range of a pixel signal for each pixel included in an input image signal, comprising:

target color setting means of setting a target color depending on which the color of said pixel signal is corrected, and Color conversion means of carrying out correction to make the color of said pixel signal coincident with or close to said target color by using said pixel signal, information of identifying a photographic scene by also using information, other than pixel information, included in said pixel signal, and said target color.

Furthermore, a second aspect of the present invention is an image processing apparatus of correcting the color of a predetermined range of a pixel signal for each pixel included in an input image signal, comprising:

target color setting means of setting a target color depending on which the color of said pixel signal is corrected, and color conversion means of carrying out correction to make the color of said pixel signal coincident with or close to said target color by using the luminance component in the color of said pixel signal, two chromaticity components excluding said luminance component in the color of said pixel signal, and said target value, wherein said color conversion means determines said correction degree by using not only said two chromaticity components of said pixel signal to be corrected but also said luminance component of said pixel signal to be corrected.

Furthermore, a third aspect of the present invention is the image processing apparatus in accordance with the first aspect of the present invention, wherein said color conversion means comprises:

intensity determination means of generating a correction intensity that is small on the periphery of the color region of said specific range set on the basis of two chromaticity components excluding the luminance component in the color of said pixel signal and large in the vicinity of the central portion of said region, correction degree setting means of setting a correction degree by also using information, other than pixel information, included in said pixel signal, and correction means of making the color of said pixel signal coincident with or close to said target color depending on said correction intensity having been generated and said correction degree having been set, wherein said correction degree setting means sets said correction degree by identifying at least an image photographing scene according to said input image signal.

Furthermore, a fourth aspect of the present invention is an image processing apparatus in accordance with the second aspect of the present invention, wherein said color conversion means comprises:

intensity determination means of generating a correction intensity that is small on the periphery of the color region of said specific range set on the basis of the luminance component and the two chromaticity components excluding said luminance component in the color of said pixel signal and large in the vicinity of the central portion of said region, and correction means of making the color of said pixel signal coincident with or close to said target color depending on said correction intensity having been generated.

Furthermore, a fifth aspect of the present invention is an image processing apparatus in accordance with the fourth aspect of the present invention, wherein said intensity determination means comprises:

first function generation means of outputting a candidate of a first correction intensity for said luminance signal, second and third function generation means of outputting candidates of second and third correction intensities for said two chromaticity components, respectively, and synthesizing means of synthesizing the candidates of said first, second and third correction intensities and outputting the result as said correction intensity.

Still further, a sixth aspect of the present invention is the image processing apparatus in accordance with the fourth aspect of the present invention, wherein said intensity determination means comprises:

first function generation means of outputting a candidate of a first correction intensity for said luminance signal, two-dimensional function generation means of outputting a second correction intensity on the basis of a two-dimensional function typified by an ellipse using said two chromaticity components, and synthesizing means of synthesizing the candidates of said first and second correction intensities and outputting the result as said correction intensity.

Still further, a seventh aspect of the present invention is the image processing apparatus in accordance with the fourth aspect of the present invention, wherein said intensity determination means comprises:

first function generation means of outputting a candidate of a first correction intensity for said luminance signal, first polar coordinate conversion means of converting said two chromaticity components into a hue signal and a saturation signal, second function generation means of outputting a candidate of a second correction intensity for said hue signal, third function generation means of outputting a candidate of a third correction intensity for said saturation signal, and synthesizing means of synthesizing the candidates of said first, second and third correction intensities and outputting the result as said correction intensity.

Still further, an eighth aspect of the present invention is the image processing apparatus in accordance with the third or fourth aspect of the present invention, wherein said correction means corrects each of said two chromaticity components to a value obtained when each of said two chromaticity components and two target chromaticity values output from said target color setting means are internally divided depending on said correction intensity.

Still further, a ninth aspect of the present invention is the image processing apparatus in accordance with the third or fourth aspect of the present invention, wherein said correction means has second polar coordinate conversion means of converting said two chromaticity components into a hue signal and a saturation signal, and said correction means corrects said hue signal and said saturation signal output from said second polar coordinate conversion means to a value obtained when said hue signal and said saturation signal and the target hue signal and the target saturation signal output from said target color setting means are internally divided depending on said correction intensity.

Still further, a 10th aspect of the present invention is the image processing apparatus in accordance with the third or fourth aspect of the present invention, wherein said intensity determination means outputs a hue correction intensity for hue correction and a saturation correction intensity for saturation correction, said correction means has second polar coordinate conversion means of converting said two chromaticity components into a hue signal and a saturation signal, hue correction means of correcting said hue signal having been converted to a value obtained when said hue signal and the target hue value output from said target color setting means are internally divided depending on said hue correction intensity, and saturation correction means of correcting said saturation signal having been converted to a value obtained when said saturation signal and the target saturation value output from said target color setting means are internally divided depending on said saturation correction intensity.

Still further, an 11th aspect of the present invention is the image processing apparatus in accordance with the third aspect of the present invention, wherein said correction degree setting means determines said correction degree according to said input image signal and photographic information at the time when an input image is taken.

Still further, a 12th aspect of the present invention is the image processing apparatus in accordance with the 11th aspect of the present invention, wherein said correction degree setting means comprises:

image identification means of identifying the photographic scene of an image according to said input image signal, photographic information identification means of identifying a photographic scene according to the photographic information at the time when said input image signal is photographed, and correction degree determination means of determining said correction degree according to the outputs of said image identification means and said image information identification means.

Still further, a 13th aspect of the present invention is the image processing apparatus in accordance with the 12th aspect of the present invention, wherein said image identification means and said photographic information identification means identify whether a person is included in an image or not.

Still further, a 14th aspect of the present invention is the image processing apparatus in accordance with the 12th aspect of the present invention, wherein said image identification means and said photographic information identification means identify whether the sky is included in an image or not.

Still further, a 15th aspect of the present invention is the image processing apparatus in accordance with the 12th aspect of the present invention, wherein said image identification means and said photographic information identification means identify whether green plants are included in an image or not.

Still further, a 16th aspect of the present invention is the image processing apparatus in accordance with the first or second aspect of the present invention, comprising:

means of interpolating a three-dimensional look-up table of using three input signals as addresses and outputting three output signals or interpolating two of said three-dimensional look-up tables, wherein the correspondence relationship of making the color of said pixel signal to correspond to the color corrected using said color conversion means is stored in said three-dimensional look-up table in advance, and the color of said each pixel signal is corrected using said three-dimensional look-up table.

Still further, a 17th aspect of the present invention is an image processing method of correcting the color of a predetermined range of a pixel signal for each pixel included in an input image signal, comprising:

a target color setting step of setting a target color depending on which the color of said pixel signal is corrected, and a color conversion step of carrying out correction to make the color of said pixel signal coincident with or close to said target color by using said pixel signal, information of identifying a photographic scene by also using information, other than pixel information, included in said pixel signal, and said target color.

Still further, an 18th aspect of the present invention is an image processing method of correcting the color of a predetermined range of a pixel signal for each pixel included in an input image signal, comprising:

a target color setting step of setting a target color depending on which the color of said pixel signal is corrected, and a color conversion step of carrying out correction to make the color of said pixel signal coincident with or close to said target color by using the luminance component in the color of said pixel signal, two chromaticity components excluding said luminance component in the color of said pixel signal, and said target value.

Still further, a 19th aspect of the present invention is a program of the image processing apparatus in accordance with the first aspect of the present invention, the program being used to operate a computer as:

target color setting means of setting the target color depending on which the color of said pixel signal is corrected, and color conversion means of carrying out correction to make the color of said pixel signal coincident with or close to said target color by using said pixel signal, information of identifying a photographic scene by also using information, other than pixel information, included in said pixel signal, and said target color.

Still further, a 20th aspect of the present invention is a program of the image processing apparatus in accordance with the second aspect of the present invention, the program being used to operate a computer as:

target color setting means of setting the target color depending on which the color of said pixel signal is corrected, and color conversion means of carrying out correction to make the color of said pixel signal coincident with or close to said target color by using the luminance component in the color of said image signal, two chromaticity components excluding said luminance component in the color of said pixel signal, and said target value.

Still further, a 21st aspect of the present invention is a recording medium having a program in accordance with the 19th or 20th aspect of the present invention, said recording medium being processable using a computer.

Still further, a 22nd aspect of the present invention is a printer comprising:

input means of inputting an image signal, image processing means of image processing the image signal having been input, and printing means of printing said image signal having been image processed on paper media, wherein the image processing apparatus in accordance with the first or second aspect of the present invention is used for said image processing means.

Still further, a 23rd aspect of the present invention is a television receiver comprising:

receiving means of receiving an image signal being broadcast, and image processing means of image processing the image signal output from said receiving means, wherein said image signal having been image processed is displayed on display means, and the image processing apparatus in accordance with the first or second invention of the present invention is used for said image processing means.

Still further, a 24th aspect of the present invention is a projector apparatus comprising:

input means of inputting an image signal, image processing means of image processing the image signal having been input, and projection means of projecting said image signal having been image processed on a screen, wherein the image processing apparatus in accordance with the first or second invention of the present invention is used for said image processing means.

Still further, a 25th aspect of the present invention is a photographing apparatus comprising:

photographing means of photographing an image, and image processing means of image processing said image signal output from said photographing means, wherein the image processing apparatus in accordance with the first or second invention of the present invention is used for said image processing means.

Still further, a 26th aspect of the present invention is a mobile communication terminal comprising:

a wireless communication circuit of outputting broadcast waves to an antenna and of inputting a received signal from the antenna, image processing means of image processing the image signal included in said received signal, and display means of displaying said image signal having been image processed, wherein the image processing apparatus in accordance with the first or second invention of the present invention is used for said image processing means.

BRIEF DESCRIPTION OF DRAWINGS

FIG. 12(*b*) is a view showing an example of the result obtained when sky region candidate detection is carries out in accordance with Embodiment 6 of the present invention;

FIG. 12(*c*) is a view showing an example of a sky region judgment mask in accordance with Embodiment 6 of the present invention;

FIG. 12(*d*) is a view showing the result obtained when the sky region judgment mask of FIG. 12(*c*) is applied to the result obtained when the sky region detection of FIG. 12(*b*) is carried out in accordance with Embodiment 6 of the present invention;

FIG. 18(*b*) is an explanatory view of a turn-back in the(a*, b*) plane in accordance with Embodiment 2 of the present invention.

EXPLANATIONS OF NUMERALS

Figure 1:
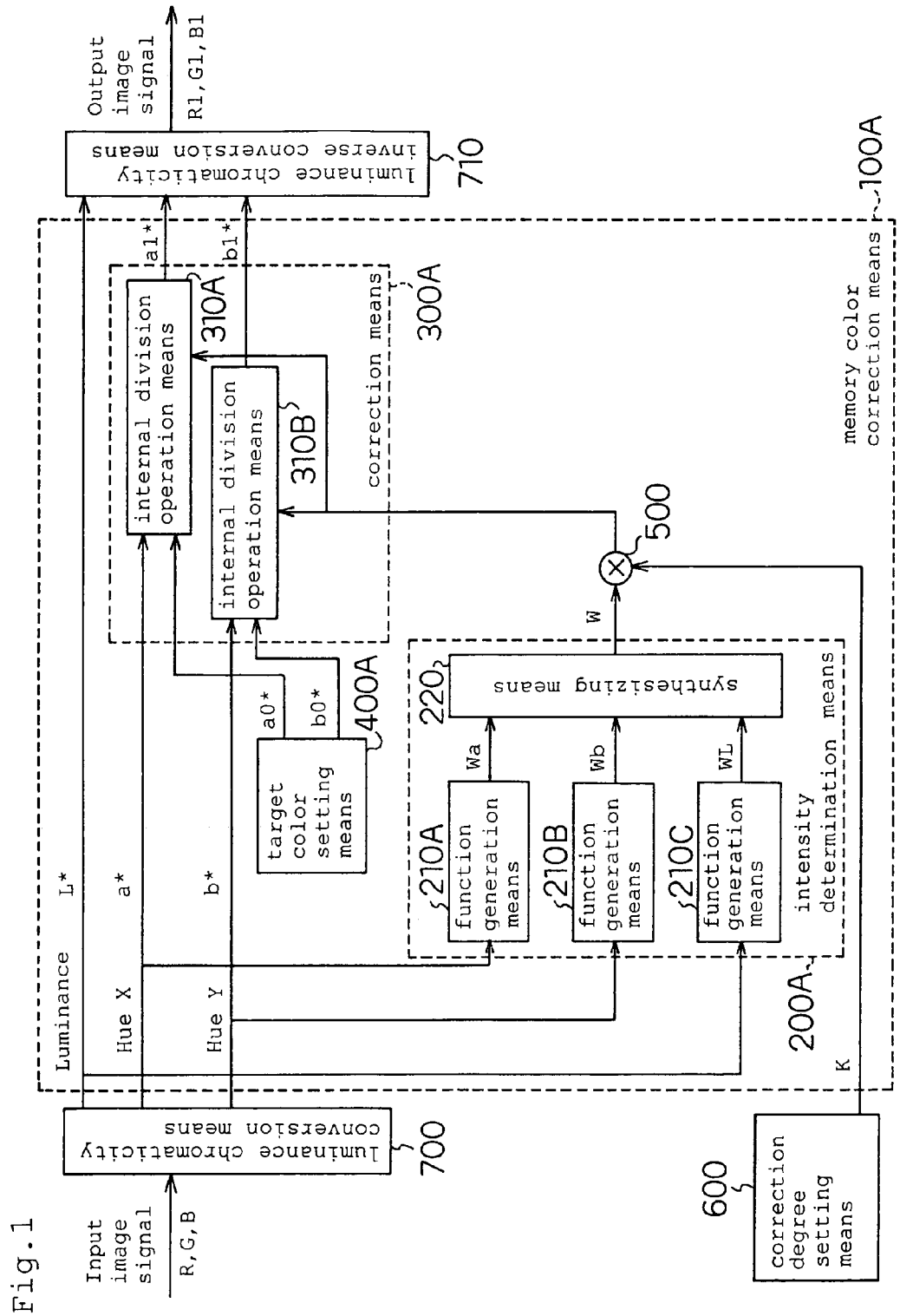
FIG. 1 is a block diagram showing a configuration of an image processing apparatus in accordance with Embodiment 1 of the present invention.

100A, 100B, 100C, 100D, 100E, 100F, 100G memory color correction means

200A, 200B, 200C, 201C, 202C intensity determination means

210A, 210B, 210C, 210D, 210E function generation means

211 two-dimensional function generation means

220, 221, 222 synthesizing means

230, 320 polar coordinate conversion means

300A, 300B correction means

310A, 310B internal division operation means

330 orthogonal coordinate conversion means

400A, 400B target color setting means

500 multiplication means

600, 600A, 600B correction degree setting means

610A sky image identification means

611 region information calculation means

612 sky region candidate detection means

613 sky region distribution judgment means

610B person image identification means

620A, 620B photographic information identification

630A, 630B correction degree determination means

700 luminance chromaticity conversion means

710 luminance chromaticity inverse conversion means

900 memory

800 memory card

BEST MODE FOR CARRYING OUT THE INVENTION

Embodiments in accordance with the present invention will be described below using the drawings.

Embodiment 1

FIG. 1 is a block diagram showing a schematic configuration of an image processing apparatus in accordance with Embodiment 1 of the present invention. The image processing apparatus in accordance with this embodiment is configured as a unit of carrying out the memory color correction of skin color and installed in a color printer wherein a memory card storing images taken using a digital camera is input and digital photographs are printed. Hence, a card reader, a JPEG development processor, a page memory, a print engine, etc., not shown, other than the devices shown in this block diagram, are present. In addition, in this embodiment, input and output pixel signals are (R, G, B) signals, and luminance chromaticity signals are (L*, a*, b*).

Numeral 100A designates a memory color correction means, numeral 700 designates a luminance chromaticity conversion means of converting pixel signals comprising (R, G, B) into luminance chromaticity signals (L*, a*, b*), numeral 710 designates a luminance chromaticity inverse conversion means of converting (L*, a*, b*)* corrected using the memory color correction means 100A into (R1, G1, B1), and numeral 600 designates a correction degree setting means of setting correction degree K depending on which memory color correction is carried out using a means not shown in this embodiment. The correction degree setting means 600 will be described later.

In addition, the memory color correction means 100A comprises an intensity determination means 200A of determining correction intensity W according to (L*, a*, b*), a target color setting means 400A of setting target chromaticity (a0*, b0*) for memory color correction, a multiplication means 500 of multiplying correction intensity W by the correction degree K, and a correction means 300A of bringing the chromaticity signals (a*, b*) output from the luminance chromaticity conversion means 700 to the chromaticity values (a0*, b0*) set using the target color setting means 400A depending on the output of the multiplication means 500.

Furthermore, the intensity determination means 200A comprises three function generation means 210A, 210B and 210C and a synthesizing means 220, and the correction means 300A comprises two internal division means 310A and 310B.

Regarding the image processing apparatus configured as described above in accordance with Embodiment 1, its operation will be described below.

The image processing apparatus in accordance with this embodiment carries out the memory color correction of an input image signal. Herein, with respect to memory colors, colors that should be or are desired to be like these psychologically, such as skin color and the green of trees, are referred to as memory colors. Even if a photograph in which human skin color and the green of trees are faithfully reproduced in color is seen, a user may not be satisfied occasionally. This is because colors different from the human skin color and the green of trees memorized by the user have been reproduced. In this kind of case, by carrying out color reproduction so that the human skin color and the green of trees become close to the memory colors, the user becomes to be satisfied with these colors. The image processing apparatus in accordance with this embodiment corrects, for example, the human skin color of the input image signal so as to become close to the memory color.

First, the input (R, G, B) signals are converted into a luminance signal L* and two chromaticity signals (a*, b*) using the luminance chromaticity conversion means 700. The L*, a* and b* signals are processed using the function generation means 210C, 210A and 210B formed of a look-up table (hereinafter referred to as LUT), and correction intensities WL, Wa and Wb respectively independent in axial directions are output. Furthermore, these correction intensities WL, Wa and Wb are synthesized using the synthesizing means 220 and converted into correction intensity W. The synthesizing means 220 in accordance with this embodiment carries out operation of outputting the minimum value of WL, Wa and Wb. Hence, the weight W for a skin color region can be determined fairly flexibly using the three one-dimensional function generation means 210A, 210B and 210C.

Figures 2A, 2B, 2C, 2D:
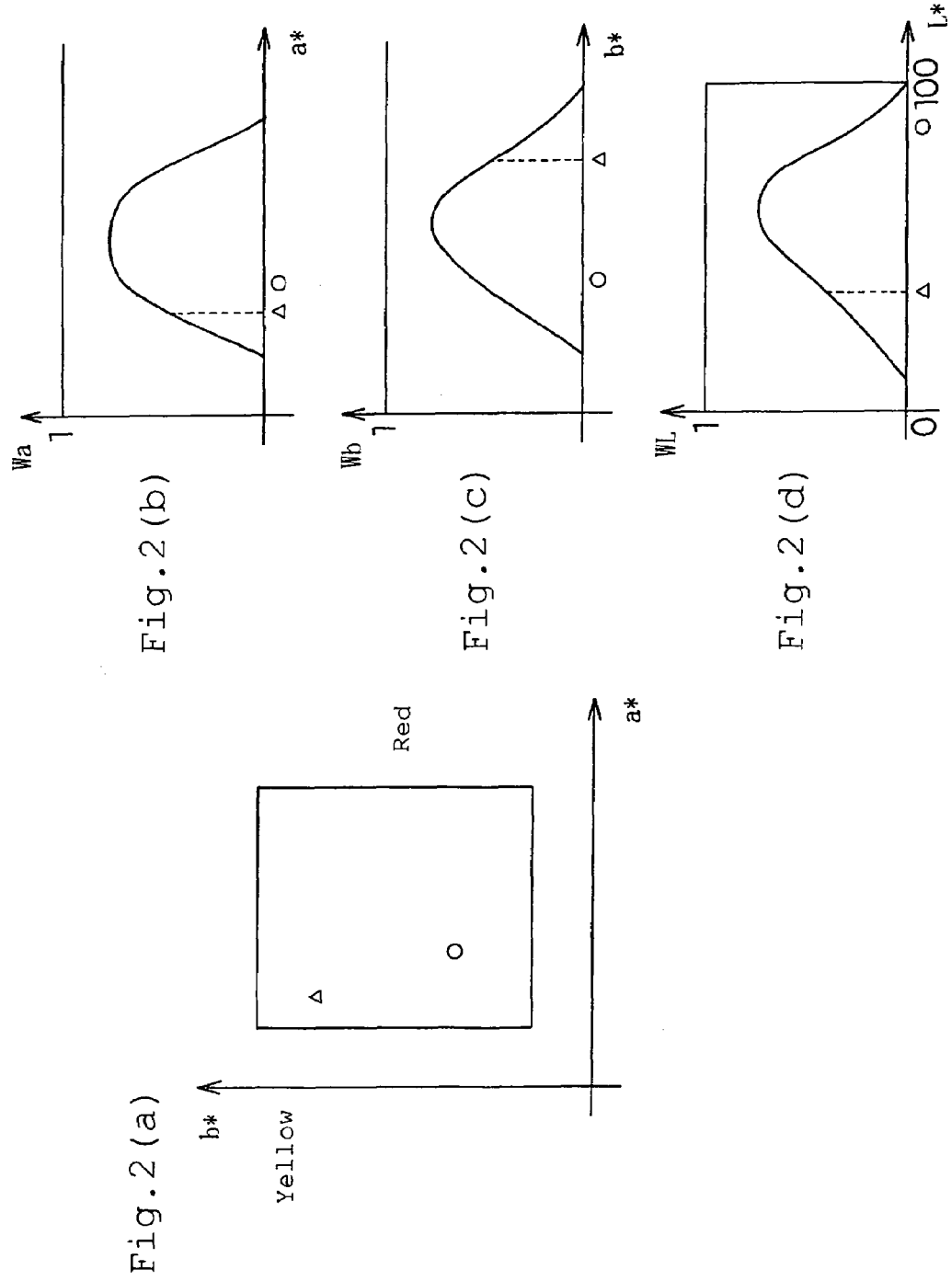
FIG. 2(a) is a view showing a skin color region synthesized using a synthesizing means in accordance with Embodiment 1 of the present invention.
FIG. 2(b) is a view showing an example of a function generation means regarding L* signal in accordance with Embodiment 1 of the present invention.
FIG. 2(c) is a view showing an example of a function generation means regarding a* signal in accordance with Embodiment 1 of the present invention.
FIG. 2(d) is a view showing an example of a function generation means regarding b* signal in accordance with Embodiment 1 of the present invention.

FIGS. 2(d), 2(b) and 2(c) show an example of the LUT for the L* and (a*, b*) signals, and the positive value ranges of the correction intensities WL, Wa and Wb determine the skin color regions in respective axial directions. FIG. 2(a) shows the skin color region determined using the three-dimensional correction intensity W synthesized using the synthesizing means 220 in the (a*, b*) plane. In other words, the skin color region in FIG. 2(a) is the region of the (a*, b*) plane in which the correction intensity W has a positive value. In this figure, the skin color region is shown, but the correction intensity W is not shown.

The size of the skin color region is determined on the basis of the statistics of various human skin colors actually photographed, and the magnitude of the weight on each axis inside the region is created by considering the pull-in degree to the target color (a0*, b0*) for the above-mentioned numerous images. According to statistical results, the skin color region occupies a considerably wide range of the first quadrant of the (a*, b*) plane when various skin colors are considered; however, since the end portions of the range are set so that the correction intensity W decreases gradually, the influence to colors deviated from the skin color is relatively small, whereby no turn-back occurs in the (a*, b*) plane and continuous gradation can be obtained.

Furthermore, when the skin colors in the shade of a person are considered, a relatively wide range is occupied on the luminance axis. However, in regions close to a highlight portion and in dark regions, colors high in saturation are not present originally, whereby the wide region determined in the (a*, b*) plane shown in FIG. 2(a) becomes improper. Since it is not necessary to correct up to very dark skin colors from the viewpoint of the beauty of an image, the function generation means 210C having the characteristic of FIG. 2(d) is effective in reducing the side effects of skin color correction.

Herein, as an example, how the correction intensity W is determined for the color indicated by Δ is described using FIG. 2. Since the color indicated by Δ is fairly bright and a skin color close to yellow and a considerably dark color, the correction intensity WL in the luminance direction has the smallest value, and this becomes the correction intensity W, resulting in relatively weak correction. Since the correction intensity W is determined in consideration of not only the chromaticity signals (a*, b*) but also the luminance signal L as described above, the side effects generated when a very dark skin color is corrected can be reduced.

Next, the operation of the correction means 300A will be described.

In this embodiment, the luminance signal L* is not corrected, but only the chromaticity signals (a*, b*) are corrected. Since the luminance signal is apt to be conspicuous in the disturbance in gradation visually, the change in color is apt to directly lead to side effects wherein false contours and unnatural gradation are caused owing to the disturbance in gradation; if the luminance of the skin color portion is desired to be changed, it can be changed naturally using known technologies, such as gradation correction and gamma correction, other than the memory color correction. In a similar method, it is of course possible to carry out moderate correction for luminance in a range wherein the side effects can be ignored.

The correction means 300A in accordance with this embodiment carries out internal division operation for the chromaticity signals (a*, b*) and the target chromaticity values (a0, b0*) using the correction intensity W according to the following expressions.

$$(a1^*)=(1-W)(a^*)+W(a0^*) \quad \text{(Expression 1)}$$

$$(b1^*)=(1-W)(b^*)+W(b0^*) \quad \text{(Expression 2)}$$

Hence, when W=0, the input chromaticity signals (a*, b*) are directly output, and when W=1, the target chromaticity values (a0*, b0*) are output.

Furthermore, it is not always necessary that the (a*, b*) values for the largest value of the correction intensity W coincide with the target color (a0*, b0*) of the skin color.

Still further, by setting the maximum value of the correction intensity W on each axis at 1 or less as shown in FIG. 2, colors close to the target color are pulled in, but they do not become the same color, whereby the natural changes in saturation and hue remain and the gradation is maintained.

The correction degree K set using the correction degree setting means 600 is set according to the instruction of a user via the user interface of the controller of a printer not shown. For example, in the case of an image including no persons or in the case that faithful color reproduction is desired without carrying out memory color correction, a value close to 0 is set; in other cases, a value close to 1 is set. The multiplication means 500 operates to adjust the correction intensity W output from the intensity determination means 200A in proportion to the above-mentioned correction degree K. For example, the multiplication means 500 adjusts the correction intensity W to the product of the above-mentioned correction degree K and the correction intensity W output from the intensity determination means 200A. Then, using the correction intensity W whose value has been adjusted, the above-mentioned internal division operation is carried out at the correction means 300A. For example, when the user sets the correction degree K at 0, memory color correction becomes completely inoperative. Furthermore, when the user sets the correction degree K at 1, sufficient memory color correction is carried out.

In this embodiment, the memory color correction of skin color is taken as an example and described; however, the embodiment can also be used for the correction of other colors as a matter of course.

Furthermore, in this embodiment, (L*, a*, b*) are used as luminance and chromaticity signals; however, other than these, numerous luminance chromaticity color spaces, such as (L*, u*, v*), (Y, Cb, Cr), (Y, R-Y, B-Y) and (Y. U, V), can be used, whereby color spaces that can be narrowed easily according to the kinds of memory colors can be used.

Moreover, the correction means 300A is configured to correct only chromaticity signals; however, it can also have a similar configuration for the luminance signal.

Besides, the synthesizing means 220 comprises a minimum value detection circuit that outputs the minimum of the three signals; however, known various nonlinear circuits having a similar effect, such as the arithmetic product of the three correction intensities, for example, can be used.

Still further, the correction degree setting means 600 can carry out setting by various automatic setting other than manual setting conducted by the above-mentioned user. With respect to the multiplication means 500, a means capable of changing the magnitude of the correction intensity W depending on the magnitude of the correction degree K, not carrying out multiplication, may also be used. For example, a minimum value detection circuit or the like can also be used.

The intensity determination means 200A and the correction means 300A in accordance with this embodiment are examples of color conversion means in accordance with the present invention; the correction degree setting means 600, the intensity determination means 200A, the multiplication means 500 and the correction means 300A in accordance with this embodiment are examples of the color conversion means in accordance with the present invention; the function generation means 210A in accordance with this embodiment is an example of a second function generation means in accordance with the present invention; the function generation means 210B in accordance with this embodiment is an example of a third function generation means in accordance with the present invention; the function generation means 210C in accordance with this embodiment is an example of a first function generation means in accordance with the present invention; the correction intensity Wa in accordance with this embodiment is an example of a candidate of a second correction intensity in accordance with the present invention; the correction intensity Wb in accordance with this embodiment is an example of a candidate of a third correction intensity in accordance with the present invention; the correction intensity WL in accordance with this embodiment is an example of a first correction intensity in accordance with the present invention; and the correction intensity W in accordance with this embodiment is an example of a correction intensity in accordance with the present invention.

Embodiment 2

Figure 3:
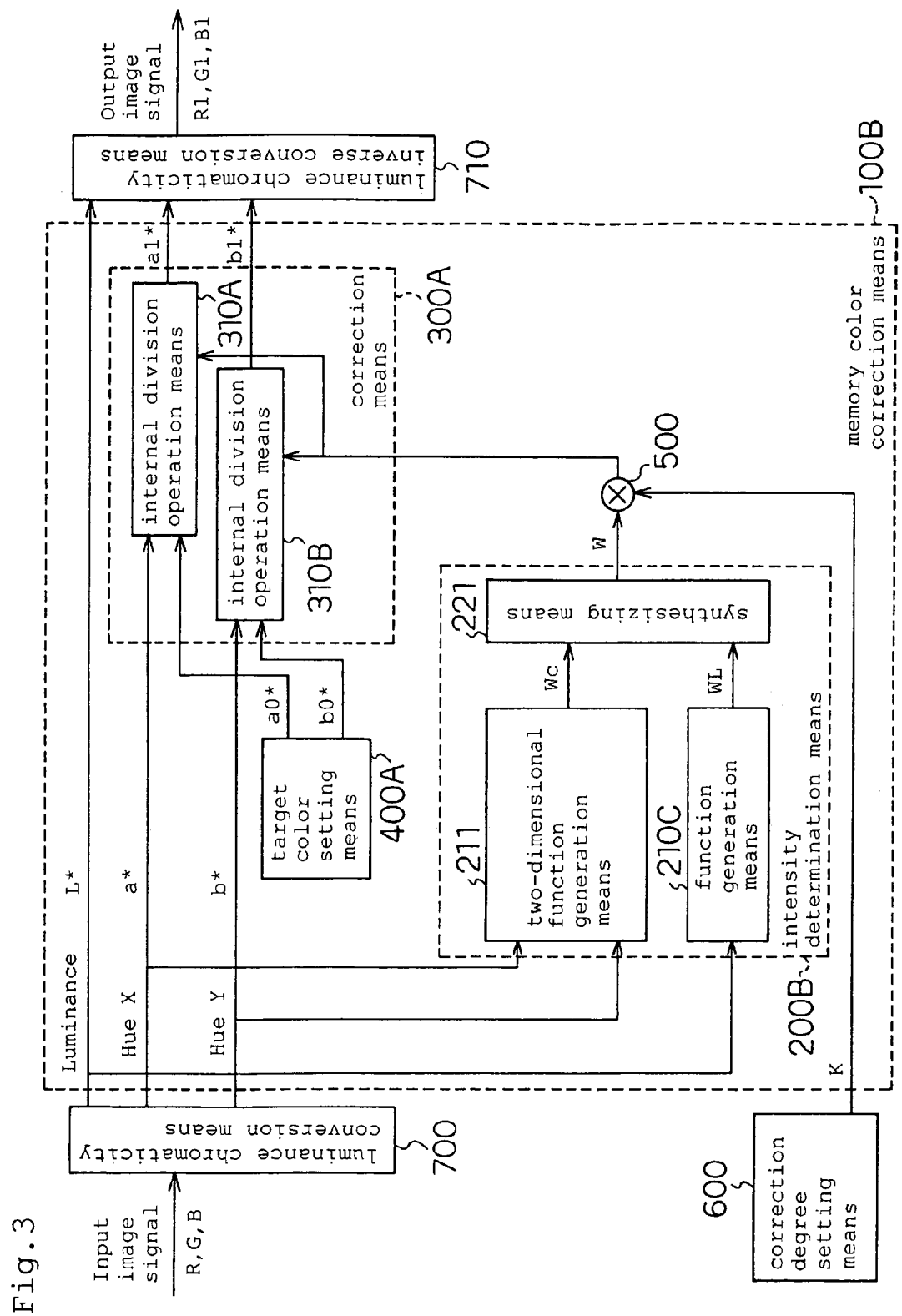
FIG. 3 is a block diagram showing a configuration of an image processing apparatus in accordance with Embodiment 2 of the present invention.

FIG. 3 is a block diagram showing a schematic configuration of an image processing apparatus in accordance with Embodiment 2 of the present invention. This embodiment has uses similar to those of the above-mentioned Embodiment 1, and is configured as a unit of carrying out the memory color correction of skin color and installed inside a color printer. Hence, a card reader, a JPEG development processor, a page memory, a print engine, etc., not shown, other than the devices shown in this block diagram, are present. In addition, in this embodiment, input and output pixel signals are (R, G, B) signals, and luminance chromaticity signals are (L*, a*, b*).

Numeral 100B designates a memory color correction means, numeral 700 designates a luminance chromaticity conversion means, numeral 710 designates a luminance chromaticity inverse conversion means, and numeral 600 designates a correction degree setting means; the same components as those in accordance with Embodiment 1 are designated using the same reference numerals, and their detailed descriptions are omitted.

In addition, the memory color correction means 100B comprises an intensity determination means 200B of determining correction intensity W according to (L*, a*, b*), a target color setting means 400A of setting target chromaticity (a0*, b0*) for memory color correction, a multiplication means 500 of multiplying correction intensity W by correction degree K, and a correction means 300A of bringing the chromaticity signals (a*, b*) output from the luminance chromaticity conversion means 700 to the chromaticity values (a0*, b0*) set using the target color setting means 400A depending on the output of the multiplication means 500.

Furthermore, the intensity determination means 200B comprises a two-dimensional function generation means 211, a function generation means 210C and a synthesizing means 221.

Regarding the image processing apparatus configured as described above in accordance with Embodiment 2, its operation will be described below.

With respect to the luminance signal L* converted using the luminance chromaticity conversion means 700, correction intensity WL is output from the function generation means 210C formed of an LUT, and with respect to the chromaticity signals (a*, b*), correction intensity Wc is output from the two-dimensional function generation means 211. The synthesizing means 221 carries out operation of outputting the minimum value of WL and Wc.

The correction means 300A and the correction degree setting means 600 are similar to those in accordance with Embodiment 1 and their descriptions are omitted.

Figure 4:
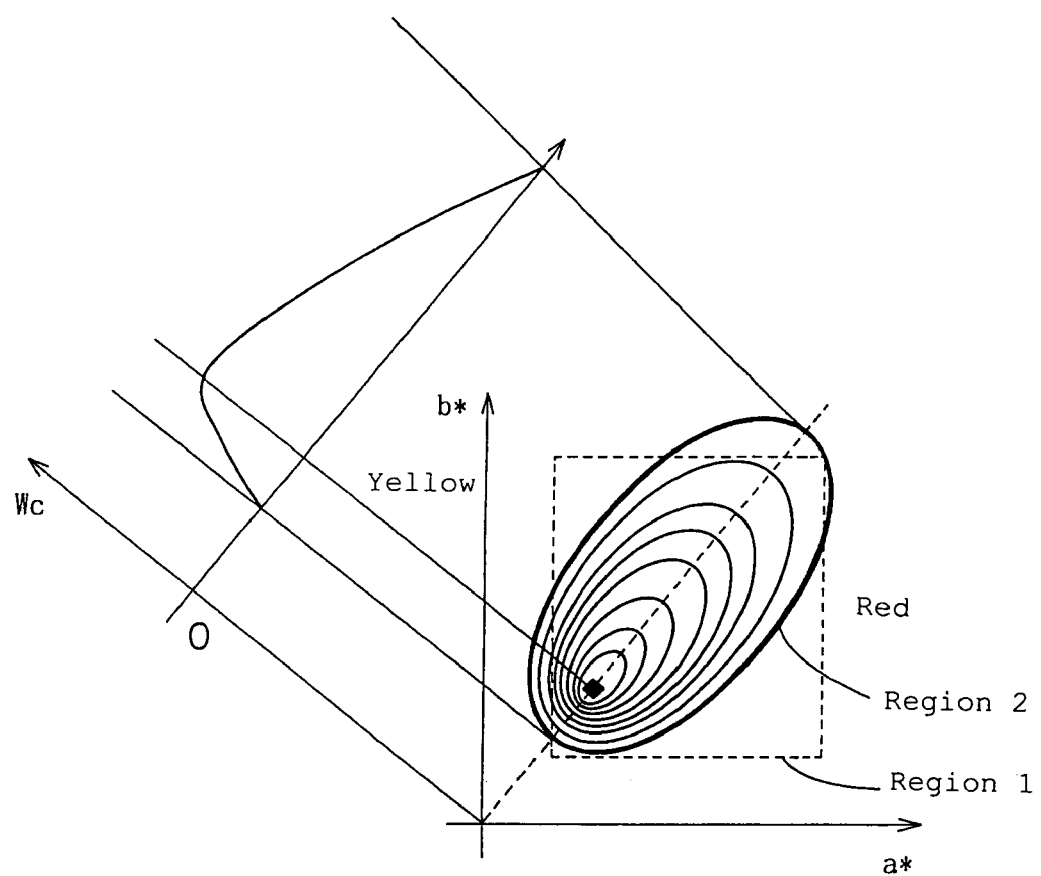
FIG. 4 is a view showing an example of a two-dimensional function generation means of generating correction intensity Wc in accordance with Embodiment 2 of the present invention.

FIG. 4 is an explanatory view showing an example of the two-dimensional function generation means 211 of generating the correction intensity Wc in the (a*, b*) plane. The ellipse drawn in a thick line and represented by region 2 in the figure indicates a skin color region, and smaller ellipses indicate correction intensity Wc using contour lines. In other words, the region 2 is a region wherein the correction intensity Wc has a positive value. The upper left graph one-dimensionally shows the cross section of the ellipse sectioned in the longitudinal-axis direction of the ellipse. Mark ♦ in the figure indicates the target color (a0*, b0*). The rectangle drawn in a dotted line and represented by region 1 shows the skin color region described in Embodiment 1 for the purpose of comparison.

As described above, from the statistical results of various human skin colors actually photographed, the two-dimensional function generation means 211 in accordance with Embodiment 2 is suited for narrowing various skin colors to a necessary and sufficient form. Furthermore, as a skin color becomes nearer to the end of the skin color region indicated by the ellipse drawn in the thick line, the correction intensity Wc becomes smaller gradually; hence, even if a color other than the skin color desired to be corrected is present inside this region, its influence is relatively small. Still further, no turn-back occurs in the (a*, b*) plane, and continuous gradation can be obtained. In this embodiment, a shape obtained by horizontally cutting an inclined elliptical cone at a predetermined height is obtained by calculation in advance and stored in the two-dimensional LUT.

Figure 18A:
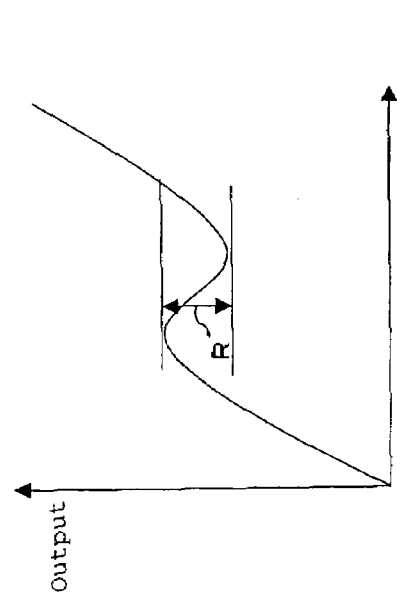
FIG. 18(*a*) is an explanatory view of a turn-back in the case of one dimension wherein one output corresponds the one input, two inputs, or three inputs.

A supplementary description regarding the meaning of the turn-back in the above-mentioned (a*, b*) plane is given herein. FIG. 18($a$) is an explanatory view of the turn-back in the case of one dimension wherein one output corresponds to one input, two inputs, or three inputs. Furthermore, FIG. 18($b$) is an explanatory view of the turn-back in the (a*, b*) plane.

Figure 18B:
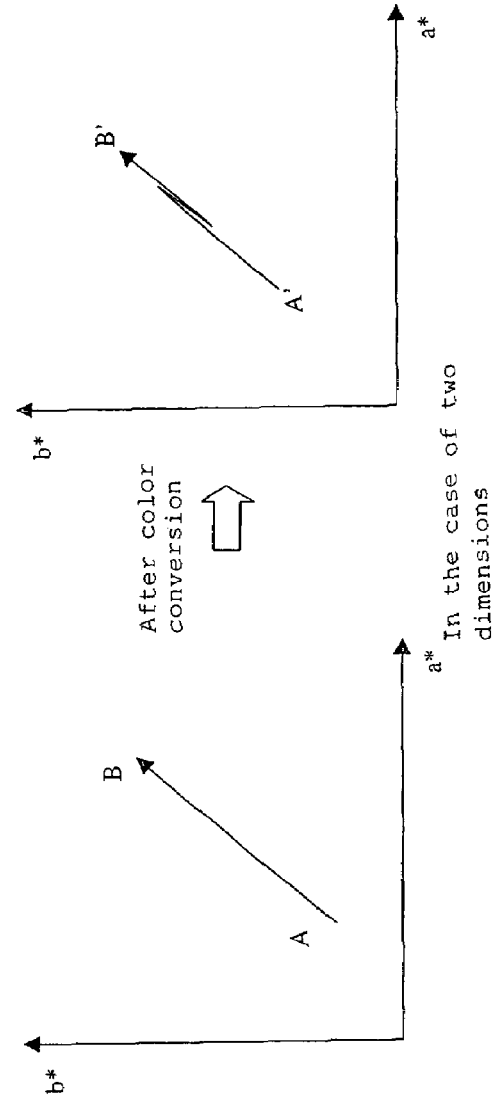

In the case of one dimension, in the range indicated by R of FIG. 18($a$), multiple inputs corresponding to a certain output are present. In other words, in the range indicated by R, it is understood that even if the input increases monotonically, the output increases monotonically and decreases once and then increases again. This kind of case is the case wherein a turn-back occurs. Hence, the fact that a turn-back occurs in the (a*, b*) plane means a state wherein in the case that when the input is changed continuously from a certain color A to a certain color B, the output changes from A' to B' as shown in FIG. 18(b), color change occurs first in the direction toward B' in the range between A' to B', but the direction changes once to the direction toward A' at a certain color, and then color change occurs again in the direction toward B'.

In this embodiment, the turn-back in the (a*, b*) plane as shown in FIG. 18(b) does not occur, but continuous gradation can be obtained.

In the direction of luminance, a configuration wherein the function generation means 210C having the characteristic shown in FIG. 2(d) identical to that of Embodiment 1 is used together is adopted, whereby the skin color region actually desired to be corrected can be narrowed necessarily and sufficiently from a wide range from a dark portion to a highlight portion, thereby being effective in reducing the side effects of skin color correction.

In this embodiment, the memory color correction of skin color is taken as an example and described; however, the embodiment can also be used for correction of other colors as a matter of course.

Furthermore, (L*, a*, b*) are used as luminance and chromaticity signals; however, other than these, numerous luminance chromaticity-based color spaces, such as (L*, u*, v*), (Y, Cb, Cr), (Y, R-Y, B-Y) and (Y, U, V), can be used, whereby color spaces that can be narrowed easily according to the kinds of memory colors can be used.

Still further, the two-dimensional function generation means has been described using the function of an elliptical shape; however, a free shape can be used actually depending on the distribution of a target color, and as a function generating method, a method of using mathematical expression calculation, other than the two-dimensional LUT, can also be used.

Moreover, the correction means 300A is configured to correct only chromaticity signals; however, it can also have a similar configuration for the luminance signals.

Besides, the synthesizing means 221 comprises a minimum value detection circuit that outputs the minimum of the two signals; however, known various nonlinear circuits having a similar effect, such as an arithmetic product of the two correction intensities, for example, can be used.

Still further, the correction degree setting means 600 can carry out setting by various automatic setting other than manual setting conducted by the above-mentioned user. With respect to the multiplication means 500, a means capable of changing the magnitude of the correction intensity W depending on the magnitude of the correction degree K, not carrying out multiplication, may also be used. For example, a minimum value detection circuit or the like can also be used. The details of the correction degree setting means 600 will be described later.

The intensity determination means 200B and the correction means 300A in accordance with this embodiment are examples of the color conversion means in accordance with the present invention; the correction degree setting means 600, the intensity determination means 200B and the correction means 300A in accordance with this embodiment are examples of the color conversion means in accordance with the present invention; the function generation means 210C in accordance with this embodiment is an example of the first function generation means in accordance with the present invention; the correction intensity WL in accordance with this embodiment is an example of the first correction intensity in accordance with the present invention; the correction intensity Wc in accordance with this embodiment is an example of the second correction intensity in accordance with the present invention; and the correction intensity W in accordance with this embodiment is an example of the correction intensity in accordance with the present invention.

Embodiment 3

Figure 5:
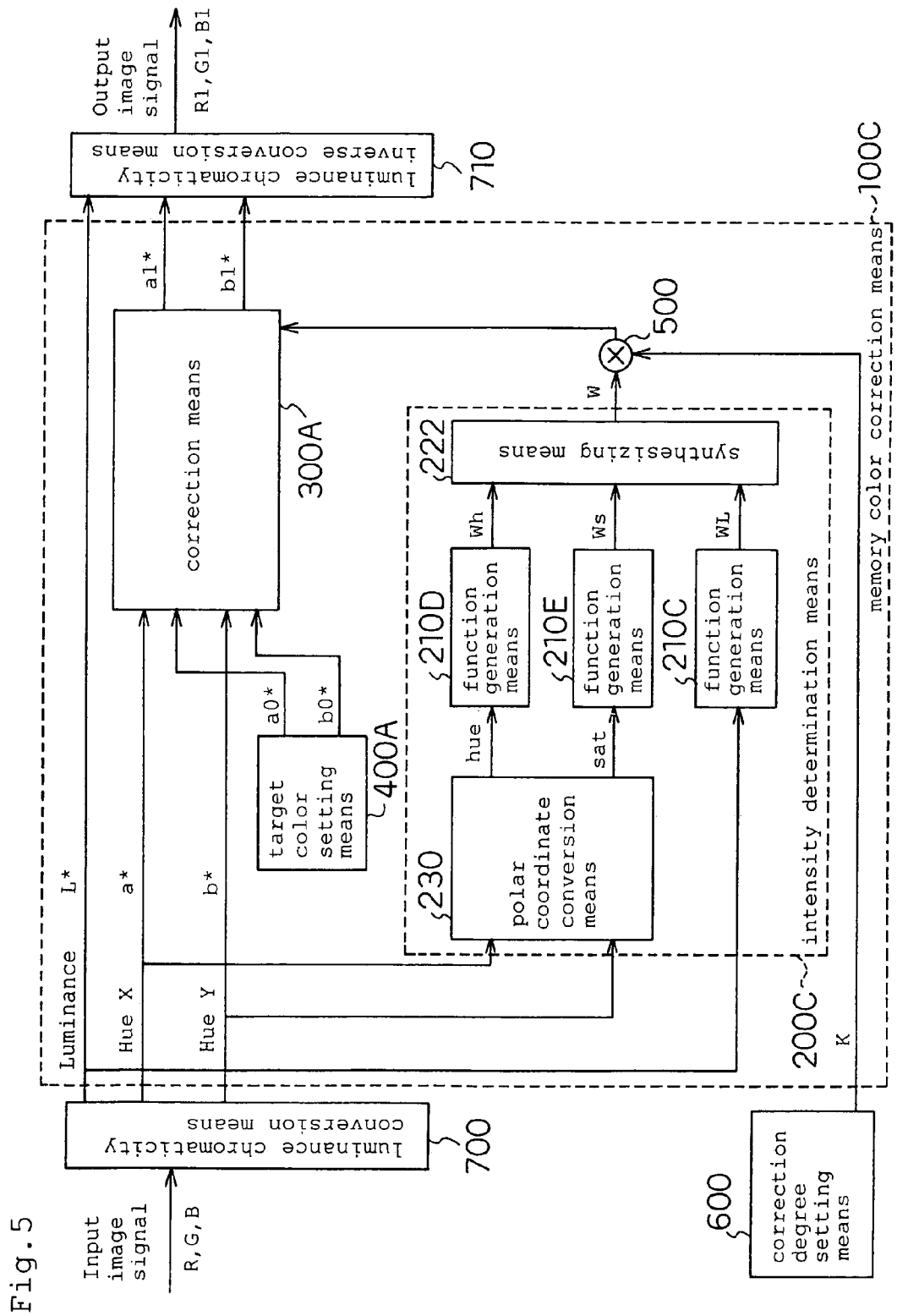
FIG. 5 is a block diagram showing a configuration of an image processing apparatus in accordance with Embodiment 3 of the present invention.

FIG. 5 is a block diagram showing a schematic configuration of an image processing apparatus in accordance with Embodiment 3 of the present invention. This embodiment has uses similar to those of the above-mentioned embodiments, and is configured as a unit of carrying out the memory color correction of sky blue. A card reader, a JPEG development processor, a page memory, a print engine, etc., not shown, other than the devices shown in this block diagram, are present. In addition, in this embodiment, input and output pixel signals are (R, G, B) signals, and luminance chromaticity signals are (L*, a*, b*).

Numeral 100C designates a memory color correction means, numeral 700 designates a luminance chromaticity conversion means, numeral 710 designates a luminance chromaticity inverse conversion means, and numeral 600 designates a correction degree setting means; the same components as those in accordance with the above-mentioned embodiments are designated using the same reference numerals, and their detailed descriptions are omitted.

In addition, the memory color correction means 100C comprises an intensity determination means 200C of determining correction intensity W according to (L*, a*, b*), a target color setting means 400A of setting target chromaticity (a0*, b0*) for sky blue, and a correction means 300A of bringing the signals to the chromaticity values (a0*, b0*) set using the target color setting means 400A depending on the correction intensity W.

Next, the configuration of the intensity determination means 200C in accordance with this embodiment, different from the configuration in accordance with the above-mentioned embodiments, will be described.

Numeral 230 designates a polar coordinate conversion means of converting the chromaticity signals (a*, b*) into hue and sat represented in the polar coordinate system, numeral 210D designates a function generation means of outputting correction intensity Wh on the hue axis, 210E designates a function generation means of outputting correction intensity Ws on the saturation axis, 210C designates a function generation means of outputting correction intensity WL on the luminance axis, and numeral 222 designates a synthesizing means of synthesizing three correction intensities.

Regarding the image processing apparatus configured as described above in accordance with Embodiment 3, its operation will be described below.

With respect to the luminance signal L* converted using the luminance chromaticity conversion means 700, correction intensity WL is output using the function generation means 210C formed of an LUT, and the chromaticity signals (a*, b*) are converted using the polar coordinate conversion means 230 such that hue is represented by angle and sat is represented by length. Hue is converted into correction intensity Wh in the hue direction using the function generation means 210D, and sat is converted into a correction intensity Ws in the saturation direction using the function generation means 210E.

Figure 6:
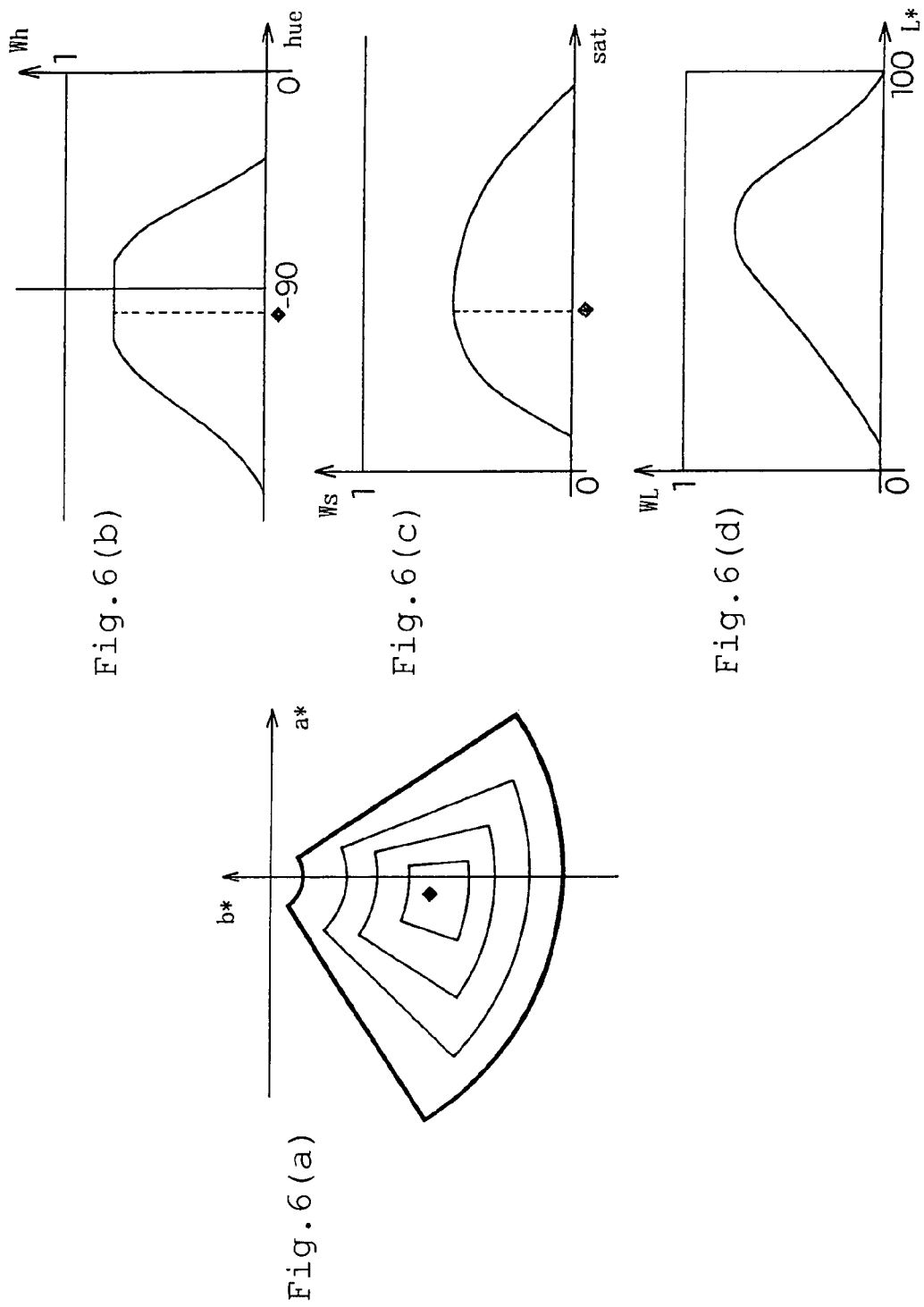
FIG. 6(a) is a view showing a sky blue region wherein correction intensity W in three dimensions is synthesized using a synthesizing means in accordance with Embodiment 3 of the present invention.
FIG. 6(b) is a view showing an example of an LUT constituting a function generation means regarding luminance L* in accordance with Embodiment 3 of the present invention.
FIG. 6(c) is a view showing an example of an LUT constituting a function generation means regarding hue in accordance with Embodiment 3 of the present invention.
FIG. 6(d) is a view showing an example of an LUT constituting a function generation means regarding sat in accordance with Embodiment 3 of the present invention.

FIGS. 6(d), 6(b) and 6(c) show examples of the LUTs constituting function generation means for luminance L*, hue and sat, respectively. The positive value ranges of the correction intensities WL, Wh and Ws determine the sky blue regions in respective axial directions. FIG. 6(a) shows the sky blue region determined using the three-dimensional correction intensity W synthesized using the synthesizing means 222 in the (a*, b*) plane, the thick line indicates the sky blue region, and the correction intensity W is shown using thin contour lines. In addition, Mark ◆ indicates a target color (a0*, b0*).

The size of the sky blue region is determined on the basis of the statistics of extracted colors obtained by extracting sky portions from various landscape images taken actually. As a result of statistics, in sky images, colors with a wide range of hue, exceeding 90 degrees in hue, from a color close to cyan to a color close to violet, are present, and colors with a wide range of saturation, from a color close to an achromatic color of an obscured sky to a bright color of a clear sky in a southern country are present. Because of this wide range, the setting of the correction intensity in the chromaticity plate in the orthogonal coordinate system and the setting in the polar coordinate system are different significantly; hence, it is almost impossible to carry out the setting in the orthogonal coordinate system, and it is found that the setting should preferably be carried out in the polar coordinate system. Hence, the end portion of the fan-shaped range is set so that the correction intensity decreases gradually, whereby the wide range of sky blue can be covered properly, and natural gradation with no turn-back can be attained.

In addition, the color of a very bright sky is close to white and low in saturation, and it is not necessary to correct up to very dark sky blue from the viewpoint of beauty of an image, whereby the function generation means 210C having the characteristic of FIG. 6(d) is effective in reducing the side effects of the memory color correction of sky blue. It is actually confirmed that the influence on objects of dark blue, not sky blue, is relieved significantly by the effect of the function generation means 210C.

In this embodiment, as in the above-mentioned embodiments, the luminance signal L* is not corrected, but only the chromaticity signals (a*, b*) are corrected. Since the luminance signal is apt to be conspicuous in the disturbance in gradation visually, the change in color is apt to directly lead to side effects wherein false contours and unnatural gradation are caused by the disturbance in gradation; if the luminance of the sky blue portion is desired to be changed, it can be changed naturally using known technologies, such as gradation correction and gamma correction, other than the memory color correction. It is of course possible to carry out moderate correction for luminance in a range wherein the side effects can be ignored.

In this embodiment, the memory color correction of sky blue is taken as an example and described; however, the embodiment can be used for the correction of other colors as a matter of course. For example, the green of plants, such as trees and grass, has a wide range in hue, as in sky blue, and also has a wide range in saturation. By carrying out the setting of the correction intensity for the green of plants, such as trees and grass, using the polar coordinate system, as in this embodiment, memory color correction can be carried out while the side effects are minimized.

Furthermore, (L*, a*, b*) are used as luminance and chromaticity signals; however, other than these, numerous luminance chromaticity color spaces, such as (L*, u*, v*), (Y, Cb, Cr), (Y, R-Y, B-Y) and (Y, U, V), can be used, whereby color spaces that can be narrowed easily according to the kinds of memory colors can be used.

Moreover, the correction means 300A is configured to correct only chromaticity signals; however, it can also have a similar configuration for the luminance signals.

Besides, the synthesizing means 222 comprises a minimum value detection circuit that outputs the minimum of the two signals; however, known various nonlinear circuits having a similar effect, such as an arithmetic product of the two correction intensities, for example, can be used.

Still further, the correction degree setting means 600 can carry out setting by various automatic setting other than manual setting conducted by the above-mentioned user. With respect to the multiplication means 500, a means capable of changing the magnitude of the correction intensity W depending on the magnitude of the correction degree K, not carrying out multiplication, may also be used. For example, a minimum value detection circuit or the like can also be used. The details of the correction degree setting means 600 will be described later.

The intensity determination means 200C and the correction means 300A in accordance with this embodiment are examples of the color conversion means in accordance with the present invention; the correction degree setting means 600, the intensity determination means 200C and the correction means 300A in accordance with this embodiment are examples of the color conversion means in accordance with the present invention; the function generation means 210C in accordance with this embodiment is an example of the first function generation means in accordance with the present invention; the function generation means 210D in accordance with this embodiment is an example of the second function generation means in accordance with the present invention; the function generation means 210E in accordance with this embodiment is an example of the third function generation means in accordance with the present invention; the correction intensity WL in accordance with this embodiment is an example of a candidate of the first correction intensity in accordance with the present invention; the correction intensity Wh in accordance with this embodiment is an example of a candidate of the second correction intensity in accordance with the present invention; the correction intensity Ws in accordance with this embodiment is an example of the third correction intensity in accordance with the present invention; and the correction intensity W in accordance with this embodiment is an example of the correction intensity in accordance with the present invention.

Embodiment 4

Figure 7:
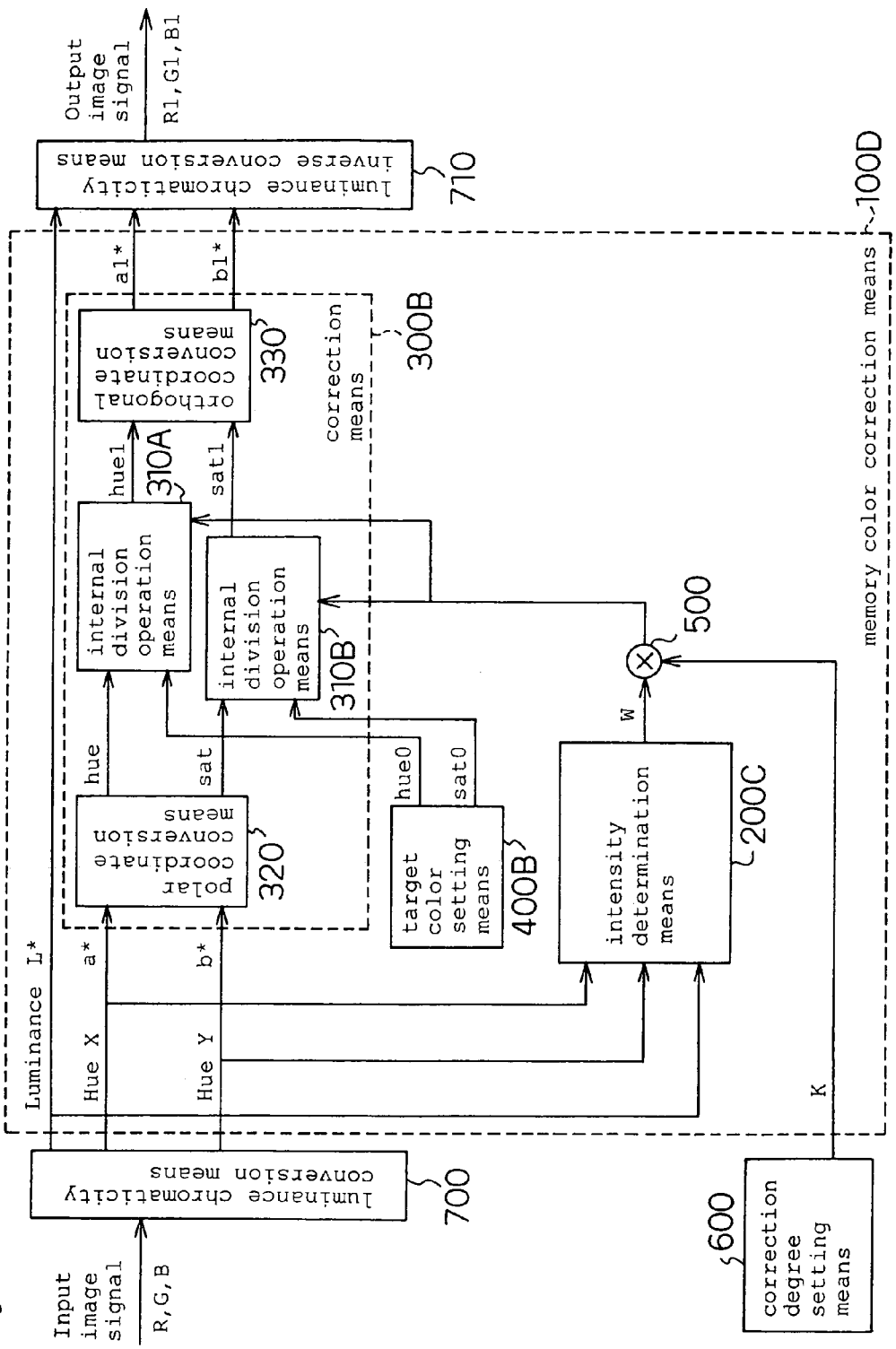
FIG. 7 is a block diagram showing a configuration of an image processing apparatus in accordance with Embodiment 4 of the present invention.

FIG. 7 is a block diagram showing a schematic configuration of an image processing apparatus in accordance with Embodiment 4 of the present invention. This embodiment is configured as a unit of carrying out the memory color correction of sky blue, as in Embodiment 3.

Numeral 100D designates a memory color correction means, numeral 700 designates a luminance chromaticity conversion means, and numeral 710 designates a luminance chromaticity inverse conversion means; the same components as those in accordance with the above-mentioned embodiments are designated using the same reference numerals, and their detailed descriptions are omitted.

In addition, the memory color correction means 100D comprises the following.

Numeral 200C designates an intensity determination means, numeral 300B designates a correction means of carrying out correction in the polar coordinate system, numeral 400B designates a target color setting means of setting a target color, that is, target hue hue0 and target saturation sat0, in the polar coordinate system.

In addition, the correction means 300B comprises the following.

Numeral 320 designates a polar coordinate conversion means, 310A and 310B designate internal division means of internally dividing the hue and sat output from the polar coordinate conversion means 320, and numeral 330 designates an orthogonal coordinate conversion means of carrying out inverse conversion from the polar coordinate system to the orthogonal coordinate system.

Regarding the image processing apparatus configured as described above in accordance with Embodiment 4, its operation will be described below.

The intensity determination means 200C similar to that of Embodiment 3 first outputs the correction intensity W of a sky blue region on the basis of the chromaticity signals (a*, b*) and the luminance signal L* output from the luminance chromaticity conversion means 700. At the same time, the chromaticity signals (a*, b*) are converted into hue and sat using the polar coordinate conversion means 230. The internal division means 310A internally divides the hue signal hue and the hue signal hue0 of the target color using the correction intensity W and outputs as hue1. In a similar way, the internal division means 310B internally divides the saturation signal sat and the saturation signal sat0 of the target color using the correction intensity W and outputs as sat1. Together with hue1 and sat1, hue and sat, not corrected, are output when W is 0; when W is 1, hue0 and sat0, representing the target sky blue, are output. The hue1 and sat1 subjected to memory color correction are returned to the chromaticity signals (a1*, b1*) subjected to memory color correction using orthogonal coordinate conversion means 330.

As described in the above-mentioned Embodiment 3, the region of sky blue has a very wide range. Hence, in Embodiment 3, the correction intensity is obtained using the hue and saturation axes obtained when chromaticity values are subjected to polar coordinate conversion in Embodiment 3; however, in a similar way, the correction means 300B is also required to carry out natural correction of sky blue having the wide range.

Figure 8:
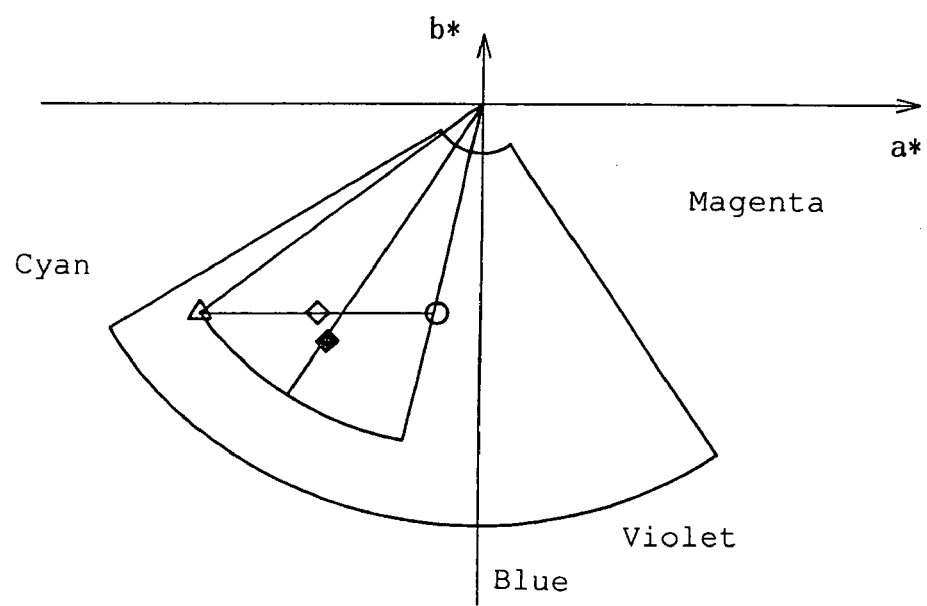
FIG. 8 is an explanatory view of the effect of the correction means in accordance with Embodiment 4 of the present invention.

FIG. 8 is an explanatory view showing the effect of the correction means 300B in accordance with this embodiment. Mark ○ indicates a target color, and mark Δ indicates an input color. A case wherein correction intensity w=0.5 is input is considered as an example. If the correction means 300A in accordance with the above-mentioned embodiments is used, an internal division of 50% in the orthogonal coordinate system is obtained, and the color indicated by mark ◇ is output. On the other hand, in the case of the correction means 300B, the hue becomes 50% in terms of angle, and the saturation is internally divided into 50% in terms of distance from the origin, whereby the color indicated by mark ♦ is output. However, in the results of the correction means 300A, the correction amount of hue becomes insufficient, and the saturation always becomes fairly low. This trend does not cause much difference in the correction within a narrow color region, such as skin color correction; however, the trend becomes conspicuous when correction is carried out for wide chromaticity ranges, such as the regions of the sky blue of the sky and the green of plants, such as trees and grass, whereby this embodiment leads to preferable results.

In this embodiment, the luminance signal L* is not corrected either; however, moderate correction can also be carried out for luminance using a similar method in a range of not causing side effects.

In this embodiment, the memory color correction of sky blue is taken as an example and described; however, the embodiment can also be used for correction of other colors as a matter of course. In particular, as described in Embodiment 3, regarding the memory color correction of the green of plants, such as trees and grass, excellent results can also be obtained as in the case of sky blue.

Furthermore, (L*, a*, b*) are used as luminance and chromaticity signals; however, other than these, numerous luminance chromaticity color spaces, such as (L*, u*, v*), (Y, Cb, Cr), (Y, R-Y, B-Y) and (Y, U, V), can be used, whereby color spaces that can be narrowed easily according to the kinds of memory colors can be used.

Still further, in this embodiment, the adjustment of the correction degree K using the correction degree setting means is omitted; however, the adjustment can be added using a method similar to that of the above-mentioned embodiment as a matter of course. The details of the correction degree setting means 600 will be described later.

The intensity determination means 200C and the correction means 300B in accordance with this embodiment are examples of the color conversion means in accordance with the present invention; the correction degree setting means 600, the intensity determination means 200C, the multiplication means 500 and the correction means 300B in accordance with this embodiment are examples of the color conversion means in accordance with the present invention; and the polar coordinate conversion means 320 in accordance with this embodiment is an example of a second polar coordinate conversion means in accordance with the present invention.

Embodiment 5

Figure 9:
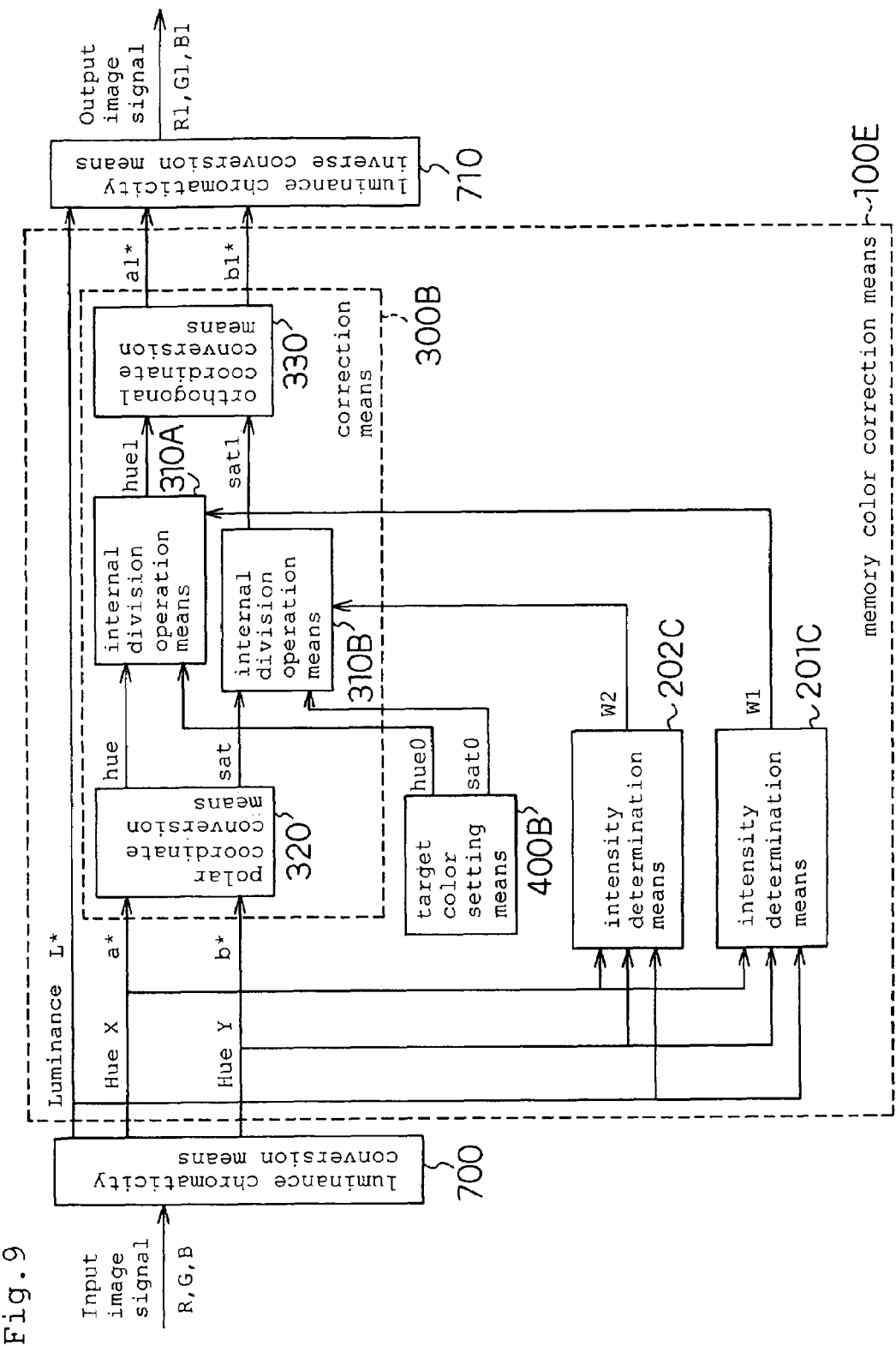
FIG. 9 is a block diagram showing a configuration of an image processing apparatus in accordance with Embodiment 5 of the present invention.

FIG. 9 is a block diagram showing a schematic configuration of an image processing apparatus in accordance with Embodiment 5 of the present invention. This embodiment is configured as a unit of carrying out the memory color correction of sky blue, as in Embodiments 3 and 4.

Numeral 100E designates a memory color correction means, numeral 700 designates a luminance chromaticity conversion means, and numeral 710 designates a luminance chromaticity inverse conversion means; the same components as those in accordance with the above-mentioned embodiments are designated using the same reference numerals, and their detailed descriptions are omitted.

In addition, the memory color correction means 100E comprises the following.

Numeral 201C and 202C each designate an intensity determination means, numeral 300B designates a correction means of carrying out correction in the polar coordinate system, numeral 400B designates a target color setting means of setting a target color, that is, target hue hue0 and target saturation sat0.

In addition, the correction means 300B comprises a polar coordinate conversion means 320, internal division means 310A and 310B and an orthogonal coordinate conversion means 330.

Next, the operation of this kind of embodiment will be described.

The image processing apparatus in accordance with Embodiment 5 is characterized in that it is equipped with two separate means, an intensity determination means 201C of determining correction intensity W1 for carrying out hue correction and an intensity determination means 202C of determining correction intensity W2 for carrying out saturation correction using the correction means 300B. The intensity determination means 201C and the intensity determination means 202C are the same in configuration as the intensity determination means 200C shown in FIG. 5, but are different in the contents of the LUTs of the function generation means 210C, 210D and 210E.

The memory color correction of sky blue operates so that the hue close to cyan is rotated in the positive direction, and the hue close to violet is rotated in the negative direction, whereby the sky blue is pulled to the hue of the target blue. In a similar way, the saturation of sky blue having too high saturation is lowered, and the saturation of sky blue having too low saturation is raised, whereby the sky blue is pulled so as to have the saturation of the target color.

However, the color of an obscured sky and the color of the sky slightly appearing from between thin clouds are very low in saturation and close to an achromatic color. If colors having these chromaticity levels are included in the sky blue correction range, a side effect is caused, that is, white and gray are raised in saturation and slightly colored in the directions of cyan, blue and violet. This side effect is recognized as color cast and significantly degrades image quality. In addition, even in the case of an object being white essentially, a slight white balance error in a camera is magnified extremely.

Hence, since it is usually difficult to include the above-mentioned sky blue being low in saturation within the memory color correction range, the above-mentioned saturation region is excluded from the correction range. In this case, the color of a cloudless sky is subjected to correction and is changed so as to have the target hue; however, the color of the sky slightly appearing from between the boundaries of clouds remains in the original color; hence, the naturalness as an image is impaired, the image becomes an artificial composite image, and the image quality improving effect of the memory color correction is impaired.

In this embodiment, two intensity determination means are provided, and the correction of hue and the correction of saturation are made independent, whereby both the above-mentioned problems can be solved.

The intensity determination means 201C for hue correction sets the correction intensity W1 being used for carrying out correction in a wide range from the above-mentioned low saturation region to the high saturation region, and the intensity determination means 202C of saturation correction sets the correction intensity W2 being used for excluding the low saturation region from the target of correction. It is effective to exclude the high saturation region from the target of correction at the same time, from a viewpoint of not lowering the saturation of bright sky blue.

Figure 10A:
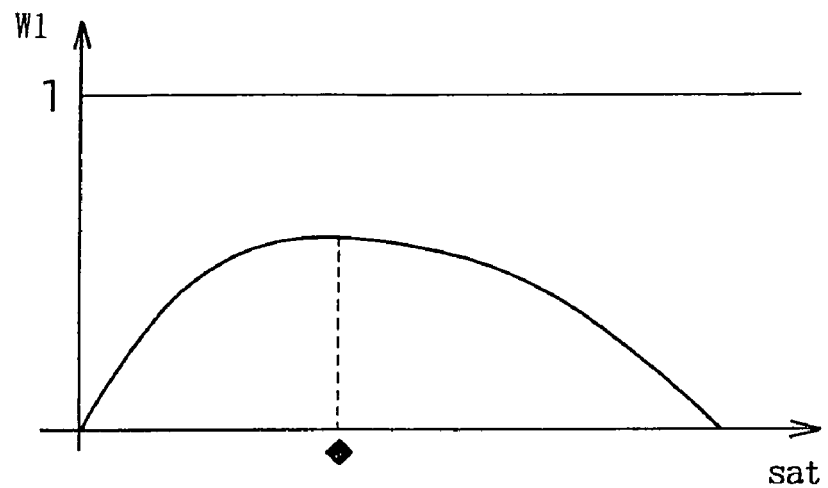
FIG. 10(a) is a view showing an example of a saturation-use function generation means 210E constituting an intensity determination means 201C in accordance with Embodiment 5 of the present invention.
Figure 10B:
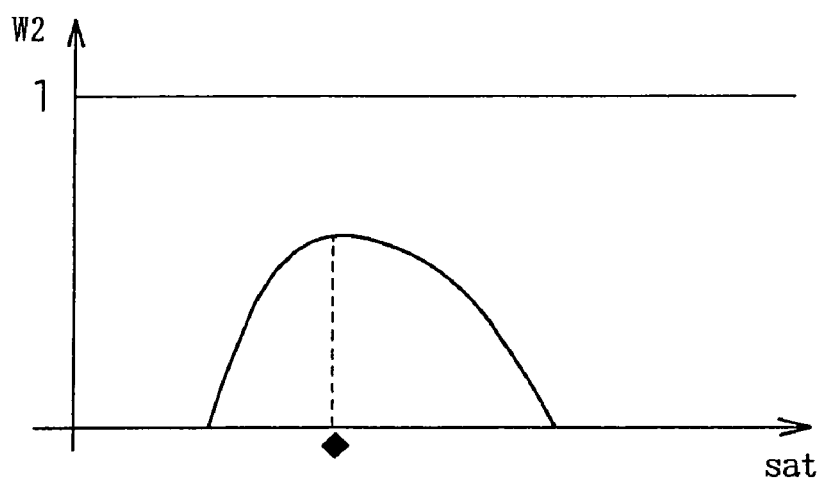
FIG. 10(b) is a view showing an example of a saturation-use function generation means 210E constituting an intensity determination means 202C in accordance with Embodiment 5 of the present invention.

FIG. 10(a) shows an example of the saturation-use function generation means 210E constituting the intensity determination means 201C, and FIG. 10(b) shows an example of the saturation-use function generation means 210E constituting the intensity determination means 202C. The range of saturation sat wherein the intensity has a positive value in the saturation-use function generation means 210E of the intensity determination means 201C of generating intensity W1 for carrying out hue correction is wider than that in the saturation-use function generation means 210E of the intensity determination means 202C of generating intensity W2 for carrying out saturation correction.

As both the hue-use function generation means 210C and the saturation-use function generation means 210E, those shown in FIGS. 6(b) and 6(d) are used. Their effects can be raised further by their respective independent optimization as a matter of course.

With this embodiment, only the hue correction is carried out for the sky blue close to gray and low in saturation, the above-mentioned problem, thereby being effective as the memory color correction of sky blue. In addition, since the saturation is not corrected, coloring is not enhanced, whereby slight coloring of gray owing to a white balance error or the like is not emphasized. Hence, since a wide region can be used as the target of the correction range, the hue at the boundary between a cloud and the sky does not become unnatural, whereby very natural memory color correction of sky blue can be carried out.

In this embodiment, the luminance signal L* is not corrected either; however, moderate correction can also be carried out for luminance using a similar method in a range of not causing side effects.

In this embodiment, the memory color correction of sky blue is taken as an example and described; however, the embodiment can also be used for correction of other colors as a matter of course. In particular, as described in Embodiment 3, regarding the memory color correction of the green of plants, such as trees and grass, excellent results can also be obtained as in the case of sky blue.

Furthermore, (L*, a*, b*) are used as luminance and chromaticity signals; however, other than these, numerous luminance chromaticity color spaces, such as (L*, u*, v*), (Y, Cb, Cr), (Y, R-Y, B-Y) and (Y, U, V), can be used, whereby color spaces that can be narrowed easily according to the kinds of memory colors can be used.

Still further, in this embodiment, the adjustment of the correction degree K using the correction degree setting means is omitted; however, the adjustment can be added using a method similar to that of the above-mentioned embodiment as a matter of course.

The intensity determination means 202C, the intensity determination means 201C and the correction means 300B in accordance with this embodiment are examples of the color conversion means in accordance with the present invention; the correction intensity W1 in accordance with this embodiment is an example of a hue correction intensity in accordance with the present invention; the correction intensity W2 in accordance with this embodiment is an example of a saturation correction intensity in accordance with the present invention; the polar coordinate conversion means 320 in accordance with this embodiment is an example of the second polar coordinate conversion means in accordance with the present invention; the internal division operation means 310A in accordance with this embodiment is an example of the hue correction means in accordance with the present invention; and the internal division operation means 310B in accordance with this embodiment is an example of the saturation correction means in accordance with the present invention.

Embodiment 6

Figure 11:
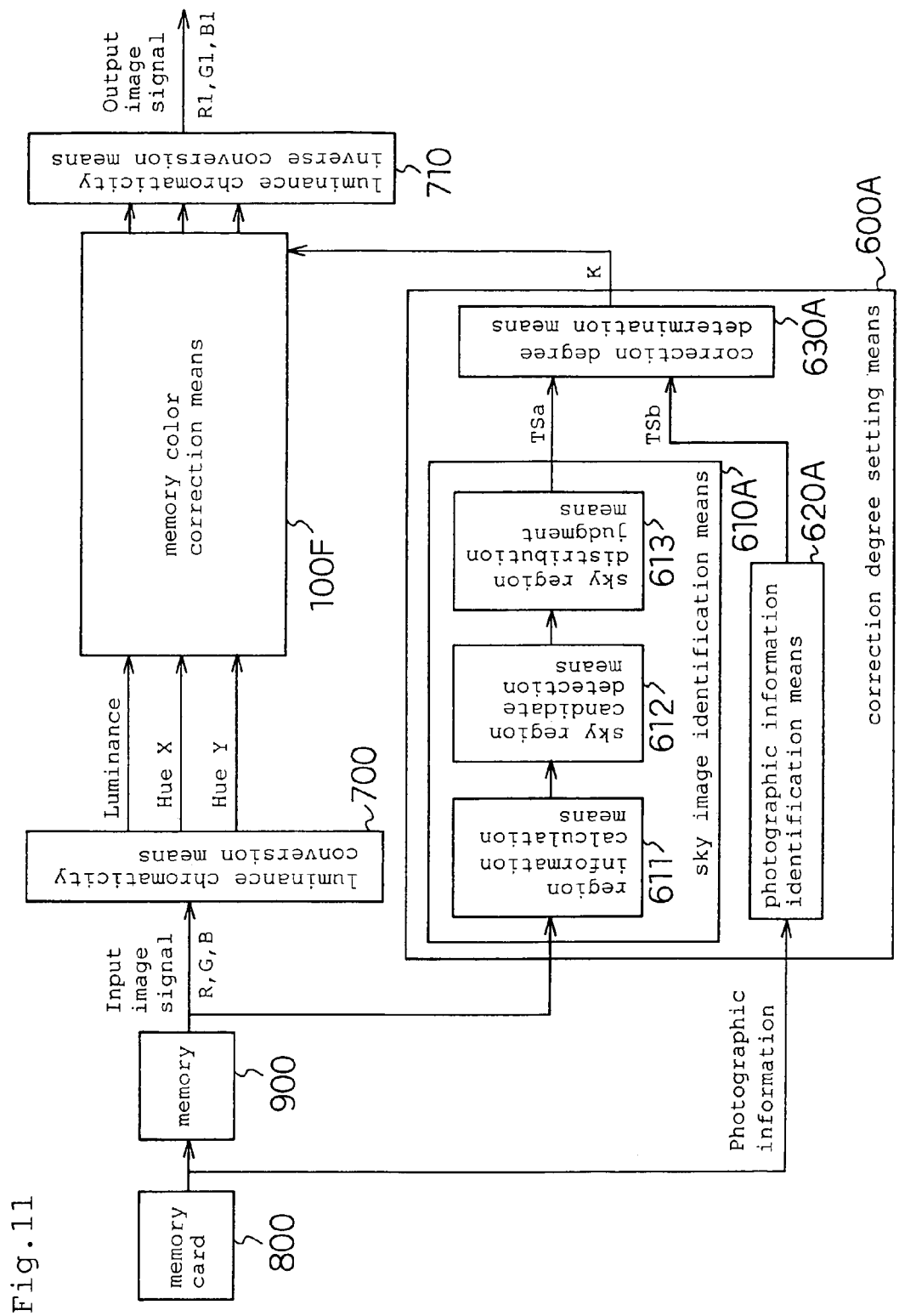
FIG. 11 is a block diagram showing a configuration of an image processing apparatus in accordance with Embodiment 6 of the present invention.

FIG. 11 is a block diagram showing a schematic configuration of an image processing apparatus in accordance with Embodiment 6 of the present invention. This embodiment is configured as a unit of carrying out the memory color correction of sky blue, as in Embodiments 3, 4 and 5.

In FIG. 11, numeral 800 designates a memory card in which photographed images and photographic information obtained at the time of photographing are recorded, numeral 900 designates a memory in which images read out from the memory card 800 are stored, numeral 700 designates a luminance chromaticity conversion means, numeral 600A designates a correction degree setting means, numeral 100F designates a memory color correction means, and numeral 710 designates a luminance chromaticity inverse conversion means; the same components as those in accordance with the above-mentioned embodiments are designated using the same reference numerals, and their detailed descriptions are omitted.

In addition, the correction degree setting means 600A comprises a sky image identification means 610A of obtaining reliability TSa of including the sky in an image according to an image signal, a photographic information identification means 620A of obtaining reliability TSb of including the sky in an image according to the photographic information, and a correction degree determination means 630A of determining correction degree K according to the reliability TSa output from the sky image identification means 610A and the reliability TSb output from the photographic information identification means 620A.

Furthermore, the sky image identification means 610A comprises a region information calculation means 611 of calculating a characteristic amount of each region obtained by dividing an image vertically and horizontally, a sky region candidate detection means 612 of judging wherein each region is a sky region candidate or not, and a sky region distribution judgment means 613 of obtaining the reliability TSa of including the sky according to the distribution of the sky region candidates.

Regarding the image processing apparatus configured as described above, its operation will be described below.

Photographed image data recorded in the memory card 800 is divided into an image signal and photographic information, and the image signal is recorded in the memory 900, and the photographic information is input to the photographic information identification means 620A.

The photographic information includes various conditions and the preset values of a camera during photographing, which are recorded in the memory card 800 using the camera together with the image signal during photographing of an image; for example, incidental information regarding photographing conditions specified in Exif serving as an image file format standard for digital still cameras corresponds to this.

The photographic information identification means 620A judges the possibility of including the sky in an object according to the photographic information. At this time, the distance to the object, the light source during photographing, photographic scene information and photographing time are used as the photographic information. In the case that only some of the above are recorded as the photographic information, identification is carried out according to only the photographic information.

More specifically, recognition is made as to whether the distance to the object is either one of macro view, near view, distant view and unknown view, and in the cases other than macro view, it is judged that there is a possibility that the sky may be included.

In addition, recognition is made as to whether the light source during photographing is either outdoor light or indoor light; in the case of outdoor light, it is judged that the sky may be included.

Regarding photographic scene information, recognition is made as to whether the scene is a night scene or not. In the cases other than a night scene, it is judged that there is a possibility that the sky may be included.

Regarding photographing time, recognition is made as to whether the time is either daytime or nighttime. The photographing time cannot be used directly for the judgment as to whether the sky is included or not; however, in the case of nighttime, it is judged that the sky is not included so that side effects on an image of the sky photographed during nighttime is avoided in memory color correction.

In addition, in the judgment of the light source during photographing, a fluorescent lamp, an incandescent lamp and the like are included as a light source that can be judged as indoor light; however, a certain type of fluorescent lamp has a color temperature close to that of daylight; in this case, it is difficult to estimate the light source. On the other hand, the incandescent lamp relatively significantly differs from daylight in terms of color temperature, and its estimation is easy. In the case that the light source during photographing is significantly different from daylight in terms of color temperature as described above, there is a high possibility that the light source of a camera may be estimated properly, and it can thus be judged that the possibility of including the sky is significantly low.

On the basis of the possibility of including the sky obtained according to the respective photographic information, the reliability TSb of including the sky in an image according to the final photographic information is obtained using the fuzzy inference. Examples of fuzzy control rules at this time are shown below.

Rule 1: IF distance to object=macro THEN TSb=small

Rule 2: IF distance to object=other than macro THEN TSb=slightly large

Rule 3: IF light source=indoor light, light source=incandescent lamp THEN TSb=small Rule 4: IF light source=outdoor light THEN TSb=slightly large Rule 5: IF photographic scene information=night scene THEN TSb=small Rule 6: IF photographic scene information=other than night scene THEN TSb=slightly large Rule 7: IF photographing time=nighttime THEN TSb=small Rule 8: IF photographing time=other than nighttime THEN TSb=slightly large Although the fuzzy inference has been used to obtain the reliability TSb of including the sky in an image according to the photographic information, a means capable of changing the magnitude of the reliability TSb by reflecting multiple pieces of photographic information may be used. For example, the table of the reliability TSb for the combination of all the photographic information may also be used.

In the above-mentioned descriptions, an example wherein the distance to the object, the light source during photographing, photographic scene information and photographing date and time are used as the photographic information has been shown; however, other than these, photographing site, shutter speed and aperture value can also be used.

During photographing an image including the sky, the amount of light is large, whereby the shutter speed becomes high and the aperture value becomes large. Hence, the brightness of an object is estimated according to the shutter speed and the aperture value; in the case that the brightness is higher than a certain value, it can be judged that there is a possibility that the sky may be included in the object. At this time, the brightness to be judged according to the photographing time can also be changed. The fact that the brightness to be judged according to the photographing time is changed means that the threshold value for judging whether the photographing environment is bright or not is changed. During daytime, there is a possibility that the photographing environment may be bright, and during nighttime, there is a possibility that the photographing environment may not be bright. Hence, for example, during daytime, the threshold value for judging whether the photographing environment is bright or not can be set higher, and during nighttime, this threshold value can be set lower.

In addition, the photographing time is divided into morning time, daytime, evening time and nighttime, and the operation of the memory color correction may be switched respectively. The judgment of morning time and evening time can be carried out by obtaining the sunrise time and sunset time of a photographing date. Furthermore, the sunrise time and sunset time can also be obtained regardless of district using the GPS information regarding the photographing site.

Furthermore, in the identification of the photographic information, the identification may be carried out using all the above-mentioned photographic information, or the identification may be carried out using part of the photographic information.

The region information calculation means 611 roughly divides an image signal output from the memory 900 into regions vertically and horizontally according to the coordinates in the image, and calculates region information comprising the average luminance, average hue and average saturation for each region. At this time, the calculation is carried out while the image signal inside the region is thinned out for high-speed processing.

The sky region candidate detection means 612 judges whether a sky region is present in each region according to the region information, that is, the output signal of the region information calculation means 611. More specifically, average R value Rmean, average G value Gmean and average B value Bmean are calculated in each region according to the average luminance Lmean, average hue and average saturation. In this embodiment, in the sky region candidate detection, the detection is carried out in a range wider than the range of the color to be actually subjected to color correction using the memory color correction means 100F, and the processing is easy; because of these reasons, the sky region candidates are judged by comparing Rmean, Gmean and Bmean. More specifically, sky region candidate C is judged according to the next logical expression for each region using the threshold value Lth of a certain luminance level.

$$C=(Bmean>Rmean)\&\&(Bmean>Gmean)\&\&(Lmean>Lth) \quad \text{(Expression 3)}$$

In Expression 3, && means logical AND operation. In other words, A&&B (A and B are logical expressions) becomes 1 when both A and B are 1, and becomes 0 when both of A and B are not 1 and when either one of A and B is not 1. Hence, Expression 3 represents that C=1 when Bmean is larger than Rmean, Rmean is larger than Gmean and Lmean is larger than Lth and that C=0 in the other cases. Herein, C=1 represents that the region is a sky region candidate, and C=0 represents that the region is not a sky region candidate.

Furthermore, in the case that a portion being high in saturation, although being small in area, is present in an image, owing to its influence, erroneous detection may occur during sky region candidate detection in some cases. For prevention of this problem, this kind of erroneous detection can be reduced by calculating the average saturation after the saturation is limited to a constant level or less.

In this embodiment, a simple method of using the magnitude relationship of the average values (R, G, B) for sky region candidate detection is adopted; however, other than this, it may be possible to adopt a method wherein the average (R, G, B) values are weighted and then compared or a method wherein a function similar to the narrowing of the target color region in the above-mentioned embodiments is used. Furthermore, luminance chromaticity color spaces, such as (L*, a*, b*), (L*, u*, v*), (Y, Cb, Cr), (Y, R-Y, B-Y) and (Y, U, V), other than (R, G, B), can also be used.

For example, as the method wherein the average (R, G, B) values are weighted and then compared, when Rmean and Gmean are respectively multiplied by weight 1 and Bmean is multiplied by a weight of larger than 1, and Expression 3 is applied to Rmean, Gmean and Bmean having been weighted as described above, the range of the color region to be judged as sky blue becomes wider. Conversely, when Rmean and Gmean are respectively multiplied by weight 1 and Bmean is multiplied by a weight of smaller than 1, and Expression 3 is applied to Rmean, Gmean and Bmean having been weighted as described above, the range of the color region to be judged as sky blue becomes narrower. Hence, when the average (R, G, B) values are weighted and then compared, the degree of identifying whether a roughly divided region is the sky or not can be fine-adjusted by adjusting the weights, whereby the accuracy of identifying whether the roughly divided region is the sky or not can be raised by setting proper weights.

In addition, as a method wherein functions similar to those used for the narrowing of the target color region in the above-mentioned embodiments, the following should only be used, for example. That is to say, the functions used in the above-mentioned embodiments are applied to the average luminance Lmean, average hue and average saturation in a roughly divided region, respectively, to obtain the respective intensities of the average luminance Lmean, average hue and average saturation. The minimum value of these intensities is used as the overall intensity of the average luminance Lmean, average hue and average saturation. In the case that the overall intensity has a positive value, it is judged that the sky is included in the roughly divided region; in the case that this overall intensity is 0, it is judged that the sky is not included in the roughly divided region. Whether the roughly divided region includes the sky or not can also be identified by using this method.

The sky region distribution judgment means 613 calculates the product of the sky region candidate information output from the sky region candidate detection means 612 and a predetermined sky region judgment mask for each region, and the reliability TSa of including the sky in an image according to the image information is obtained from the sum thereof.

Figure 12B:
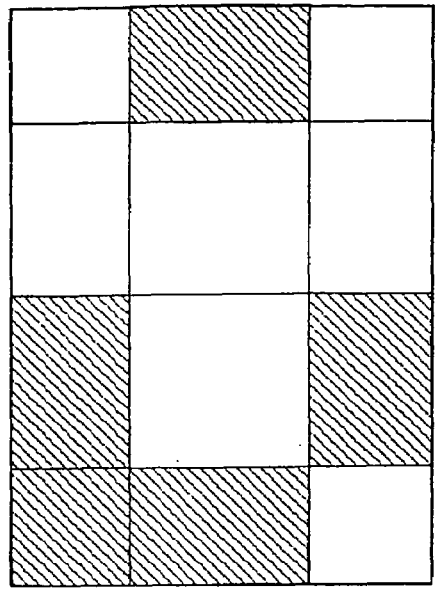
FIG. 12(*a*) is a view showing an example of a color image to be input in accordance with Embodiment 6 of the present invention.
Figure 12D:
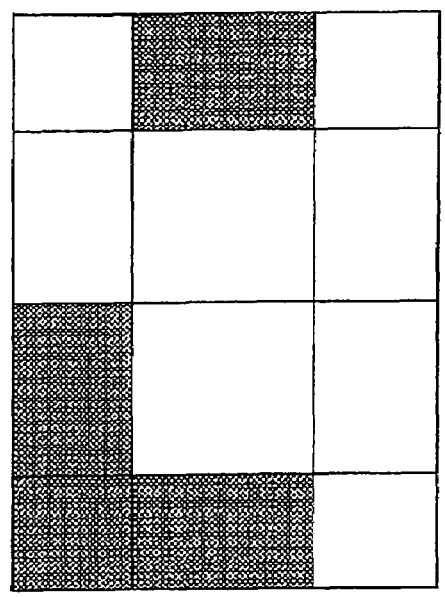

In an image obtained by photographing a landscape, the sky is usually positioned in the upper portion of the image. Hence, a proper judgment can be made by excluding the lower portion of the image from the target of processing at the time of sky region judgment. In addition, a camera is sometimes held vertically during photographing so that an image is taken an oblong image; even in this kind of case, judgment can be carried out properly by using the left and right portions of the image as the targets for sky region judgment. FIG. 12(c) shows an example of the sky region judgment mask in which these are reflected. In this example, the sky region judgment mask is formed of binary values, and the lower central portion of the image is excluded from the target for sky region judgment; however, for example, it may be possible to use a configuration wherein each region is weighted so that the upper portion of the image is weighted heavily and the lower portion is weighted lightly.

At this time, in the case that information as to whether the image is a vertical image or a horizontal image is obtained as photographic information, the sky region judgment mask can also be changed according to the information.

In addition, the operation of the sky region candidate detection means 612 can also be changed according to the judgment results from the photographic information. For example, since the sky is not used as a main object usually, a sky region judgment mask of using regions other than the object region as the sky region judgment target can also be obtained by using information regarding the position and region of the object in the photographic information.

Figure 12A:
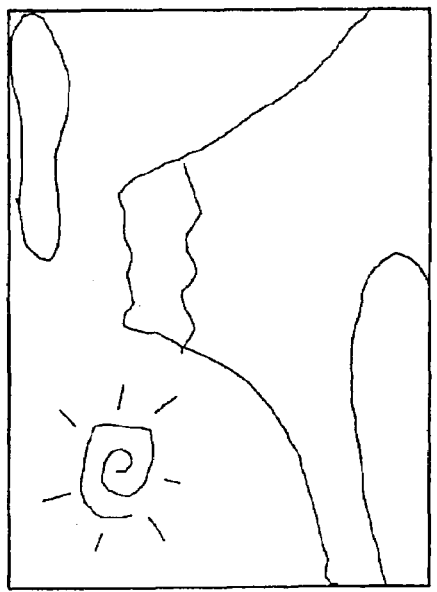
Figure 12C:
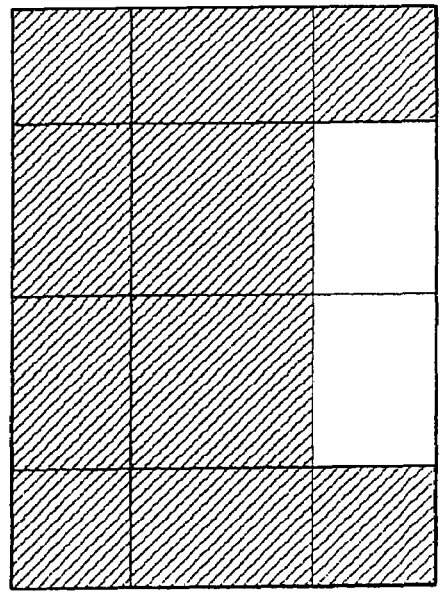

FIG. 12(a) shows a color image to be input, and this case is an conceptual view of a landscape image wherein the sky is photographed in the upper portion of the image and a lake is photographed in the lower portion of the image. FIG. 12(b) shows the result obtained when the image is divided into regions of three blocks in the vertical direction and four blocks in the horizontal direction and sky region candidate detection is carried out. FIG. 12(c) shows a sky region judgment mask, and FIG. 12(d) shows the result obtained when this judgment mask is applied to the result of FIG. 12(b). By virtue of sky region candidate detection, the correction degree determination means 630A determines the final correction degree K as the product of the reliability TSa of including the sky in the image according to the image signal output from the sky image identification means 610A and the reliability TSb of including the sky in the image according to the photographic information output from the photographic information identification means 620A.

In the case that no photographic information has been recorded, the photographic information identification means 620A does not output the reliability TSb, and the correction degree determination means determines the correction degree K by using only the reliability TSa.

The luminance chromaticity conversion means 700 converts the image signal output from the memory into luminance chromaticity signals. The memory color correction means 100F carries out memory color correction for the luminance chromaticity signals output from the luminance chromaticity conversion means 700 depending on the correction degree K output from the correction degree determination means 630A.

Hence, even an image being difficult in the judgment as to whether the sky is included or not when either the image or the photographic information is used independently can be judged with high reliability; whereby it is possible to reduce a side effect of carrying out the memory color correction of sky blue for an image not including the sky.

In addition, the correction degree determination means 630A may use continuous values as the correction degree K, as in this embodiment, or may turn on/off memory color correction by adopting binarization using a threshold value. In the case of a means capable of changing the magnitude of the correction degree K depending on the magnitude of the reliabilities TSa and Tsb, multiplication may not be used.

Furthermore, the correction degree K is used for memory color correction in this embodiment; however, other than this, it can also be used for white balance adjustment and gradation correction. In this case, it becomes possible that proper effects are obtained by changing information derived from the photographic information and image depending on the contents of image processing to be carried out.

In this embodiment, a configuration in the case that sky blue is corrected is shown; however, correction of other colors can also be carried out by properly configuring the image identification means and the photographic identification means. This embodiment can be applied to, for example, a case of correcting the green of plants, such as trees and grass. Furthermore, multiple colors in one image can also be corrected by using a configuration having multiple correction degree setting means and multiple memory color correction means.

The correction degree setting means 600A and the memory color correction means 100F in accordance with this embodiment are examples of the color conversion means in accordance with the present invention; and the sky image identification means 610A in accordance with this embodiment is an example of the image identification means in accordance with the present invention.

Embodiment 7

Figure 13:
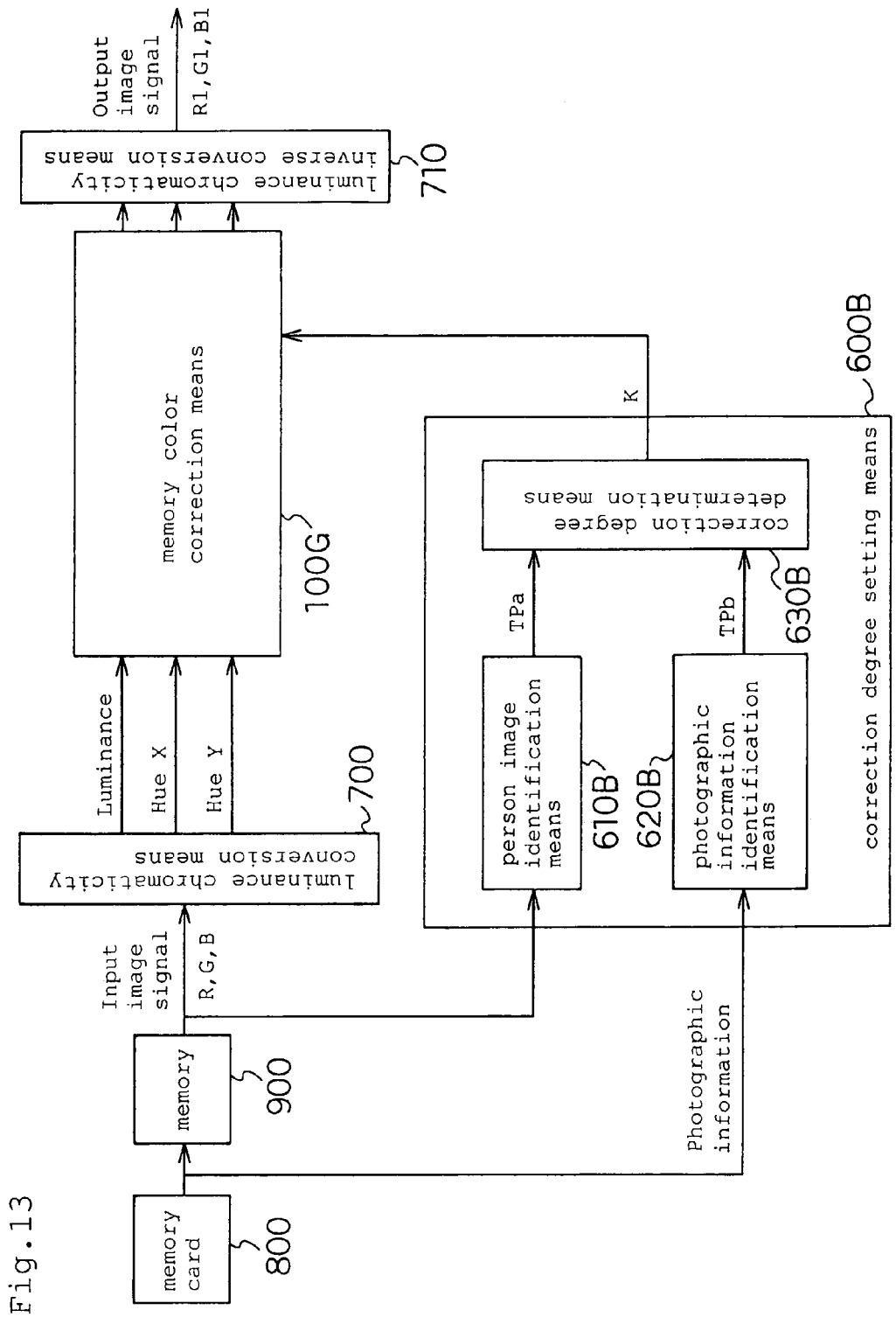
FIG. 13 is a block diagram showing a configuration of an image processing apparatus in accordance with Embodiment 7 of the present invention.

FIG. 13 is a block diagram showing a schematic configuration of an image processing apparatus in accordance with Embodiment 7 of the present invention. This embodiment is configured as a unit of carrying out the memory color correction of skin color, as in the above-mentioned Embodiments 1 and 2.

In FIG. 13, numeral 800 designates a memory card in which photographed images and photographic information obtained at the time of photographing are recorded, numeral 900 designates a memory in which images read out from the memory card 800 are stored, numeral 700 designates a luminance chromaticity conversion means, numeral 600B designates a correction degree setting means, numeral 100G designates a memory color correction means, and numeral 710 designates a luminance chromaticity inverse conversion means; the same components as those in accordance with the above-mentioned embodiments are designated using the same reference numerals, and their detailed descriptions are omitted.

In addition, the correction degree setting means 600B comprises a person image identification means 610B of obtaining reliability TPa of including a person in an image according to an image signal, a photographic information identification means 620B of obtaining reliability TPb of including a person in an image according to photographic information, and a correction degree determination means 630B of determining correction degree K according to the reliability TPa output from the person image identification means 610B and the reliability TPb output from the photographic information identification means 620B.

Next, the operation of this embodiment will be described.

Photographed image data recorded in the memory card 800 is divided into an image signal and photographic information, and the image signal is recorded in the memory 900, and the photographic information is input to the photographic information identification means 620B.

The photographic information includes various conditions and the preset values of a camera during photographing, which are recorded in the memory card 800 using the camera together with the image signal during photographing of an image; for example, incidental information regarding photographing conditions specified in Exif serving as an image file format standard for digital still cameras corresponds to this.

The photographic information identification means 620B judges the possibility of including a person in an object according to the photographic information. At this time, photographic scene information and the distance to the object are used as the photographic information.

More specifically, in the case that the photographic scene information is a person, it is judged that there is a high possibility that a person may be included in an object.

In addition, in the case that the distance to an object is judged as macro photographing or distant view, it is judged that there is a low possibility that a person may be included in the object as an object. This is because in macro photographing, a small object is photographed, and the object is rarely a person, and because even if a person is photographed in distant view, its rate in the image is small, and it is estimated that the person is not a main object.

The reliability TPb of including a person in an image according to final photographic information is obtained on the basis of the fuzzy inference as in the above-mentioned Embodiment 6 since there is a possibility that a person may be included in an object obtained from respective photographic information.

Examples of using photographic scene information and the distance to an object as the photographic information are provided in the above-mentioned descriptions; however, other than these, information regarding flash light emission can also be used.

More specifically, in the case of flash light emission, when its return is not detected or when the luminance at the central portion in an image is not relatively high, it is estimated that the object is located at a distance that the flash light does not reach. In this case, it is judged that there is a low possibility that a person may be included in the object, as in the case that the distance to the above-mentioned object is judged as distant view.

In addition, in the identification of the photographic information, the identification may be carried out using all the above-mentioned photographic information, or the identification may be carried using part of the photographic information.

The person image identification means 610B obtains the reliability TPa of including a person in an object according to an input image signal. For this purpose, a method wherein an image is divided into multiple regions and the judgment as to whether the color in each region is skin color or not can be adopted, as in Embodiment 6, or various known means of making judgment on the basis of the distribution of colors included in an image and the like can be used.

At this time, the target regions of an image subjected to person recognition can be set according to the information indicating the position and region of an object and the information of the distance to the object in the photographic information.

The correction degree determination means 630B determines the final correction degree K as the product of the reliability TPa of including a person in the image according to the image information output from the person image identification means and the reliability TPb of including a person in the image according to the photographic information output from the photographic information identification means 620B.

In the case that no photographic information has been recorded, the photographic information identification means 620B does not output the reliability TPb, and the correction degree determination means determines the correction degree K by using only the reliability TPa.

As in the above-mentioned Embodiment 6, in the correction degree determination means 630B, the correction degree K may be binarized using a threshold value, or a means other than multiplication may also be used.

The luminance chromaticity conversion means 700 converts the image signal output from the memory into luminance chromaticity signals. The memory color correction means 100G carries out memory color correction for the luminance chromaticity signals output from the luminance chromaticity conversion means 700 depending on the correction degree K output from the correction degree determination means 630B.

Furthermore, the correction degree K is used for memory color correction in this embodiment; however, other than this, it can also be used for white balance adjustment and gradation correction. In this case, it becomes possible that proper effects are obtained by changing information derived from the photographic information and image depending on the contents of image processing to be carried out.

In this embodiment, a configuration in the case that human skin color is corrected is shown; however, correction of other colors can also be carried out by properly configuring the image identification means and the photographic identification means.

Furthermore, multiple colors in one image can also be corrected by using a configuration having multiple correction degree setting means and multiple memory color correction means.

The correction degree setting means 600B and the memory color correction means 100G in accordance with this embodiment are examples of the color conversion means in accordance with the present invention; and the person image identification means 610B in accordance with this embodiment is an example of the image identification means in accordance with the present invention.

The contents described in the above-mentioned embodiments are not limited to hardware mounting but can be configured by software processing as a matter of course. In addition, the software processing is not limited to only real-time processing; for example, a configuration wherein the results obtained by preprocessing in accordance with the above-mentioned embodiments are stored in a three-dimensional look-up table (3DLUT) in which R, G and B are referred to as addresses and the 3DLUT is referred to during real-time processing, such as printing, is possible as a matter of course. In addition, image processing results including memory color correction can be obtained without enlarging the scale of hardware by storing the results obtained when the memory color correction described in this embodiment is carried out together in the 3DLUT being used for other purposes, such as color correction for printing. Furthermore, conformation to the correction degree being given in real time can be attained by internally dividing the respective reference results of an LUT including memory color correction and an LUT not including memory color correction by the correction degree.

Embodiment 8

FIGS. 14 to 17 are configuration diagrams of devices incorporating an image processing apparatus in accordance with this embodiment. In Embodiment 8, application examples in which the image processing apparatuses described in the above-mentioned respective embodiments are incorporated in various devices will be described. The components described in the above-mentioned respective embodiments are designated using the same numerals, and their descriptions are omitted.

Figure 14:
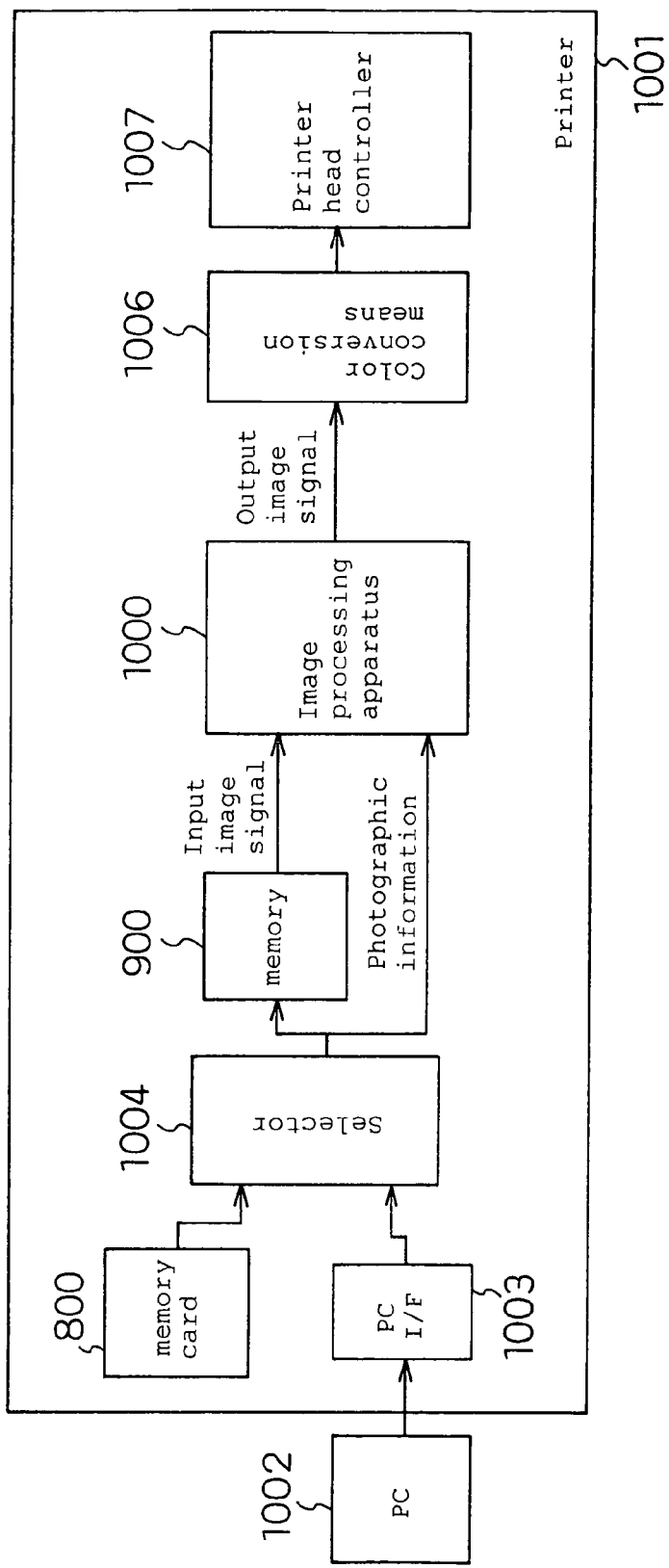
FIG. 14 is a block diagram showing a configuration of a printer in accordance with Embodiment 8 of the present invention.
Figure 15:
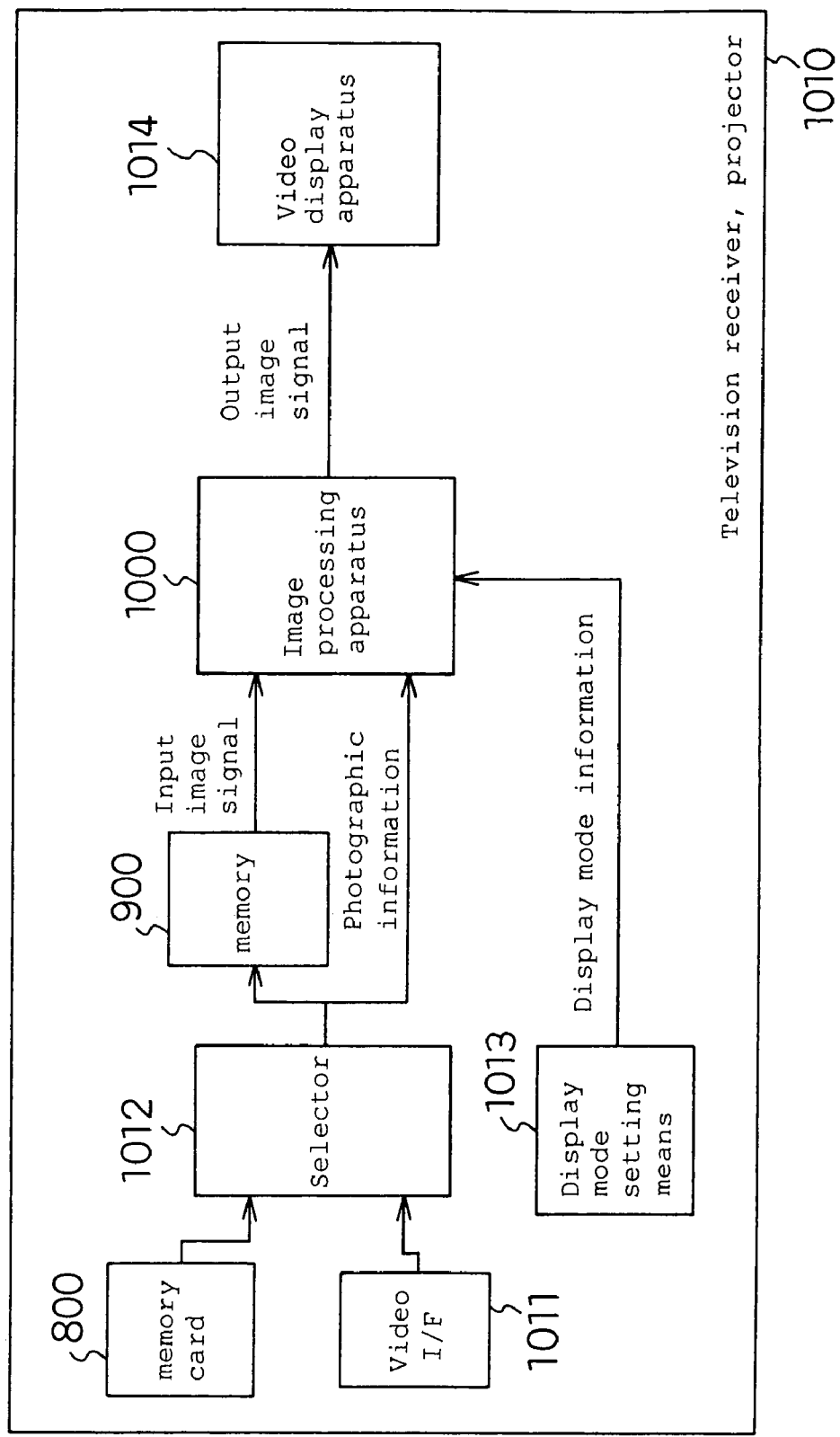
FIG. 15 is a block diagram showing a configuration of a television receiver (projector) in accordance with Embodiment 8 of the present invention.
Figure 16:
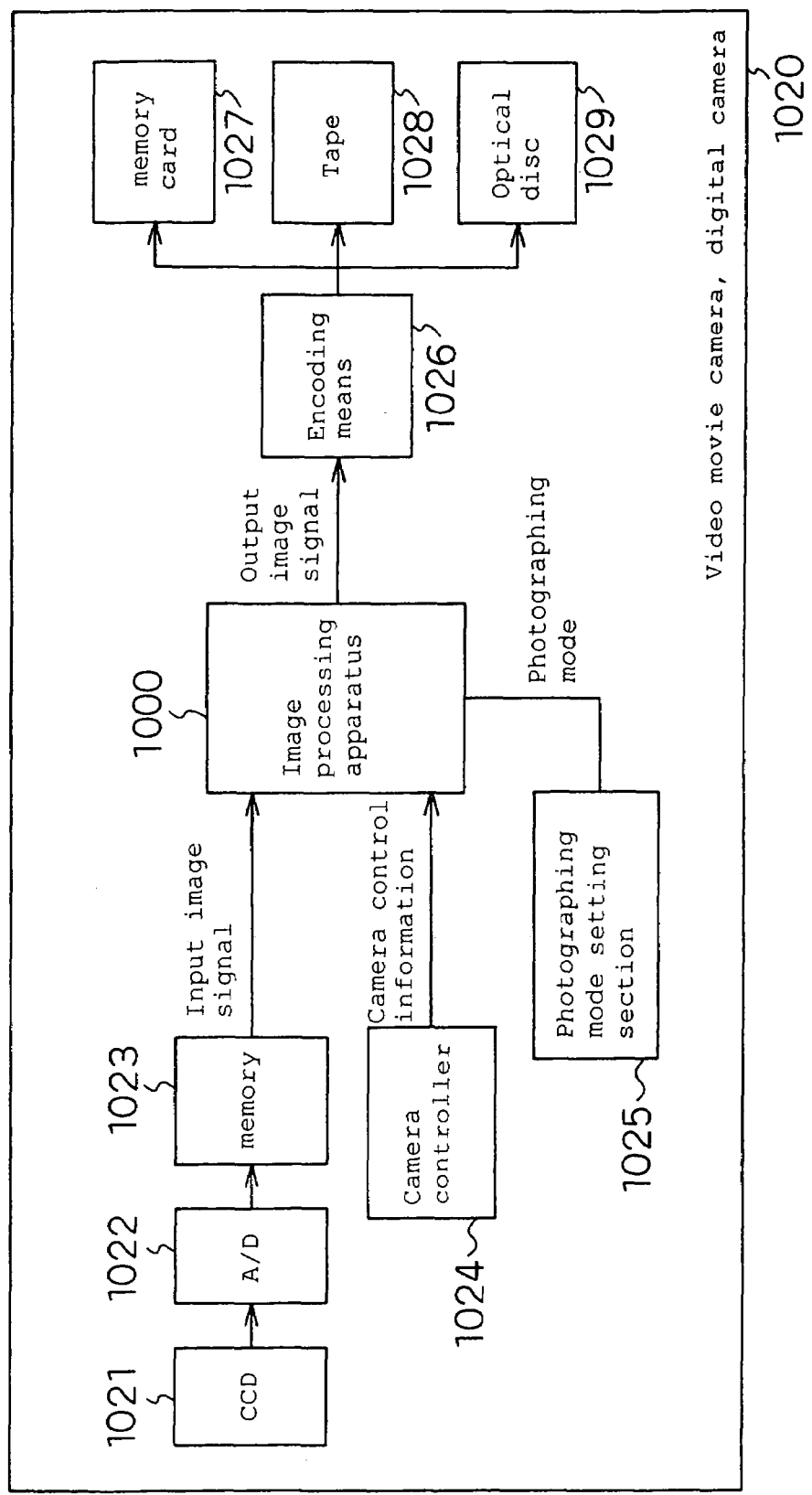
FIG. 16 is a block diagram showing a configuration of a video movie camera (digital camera) in accordance with Embodiment 8 of the present invention.
Figure 17:
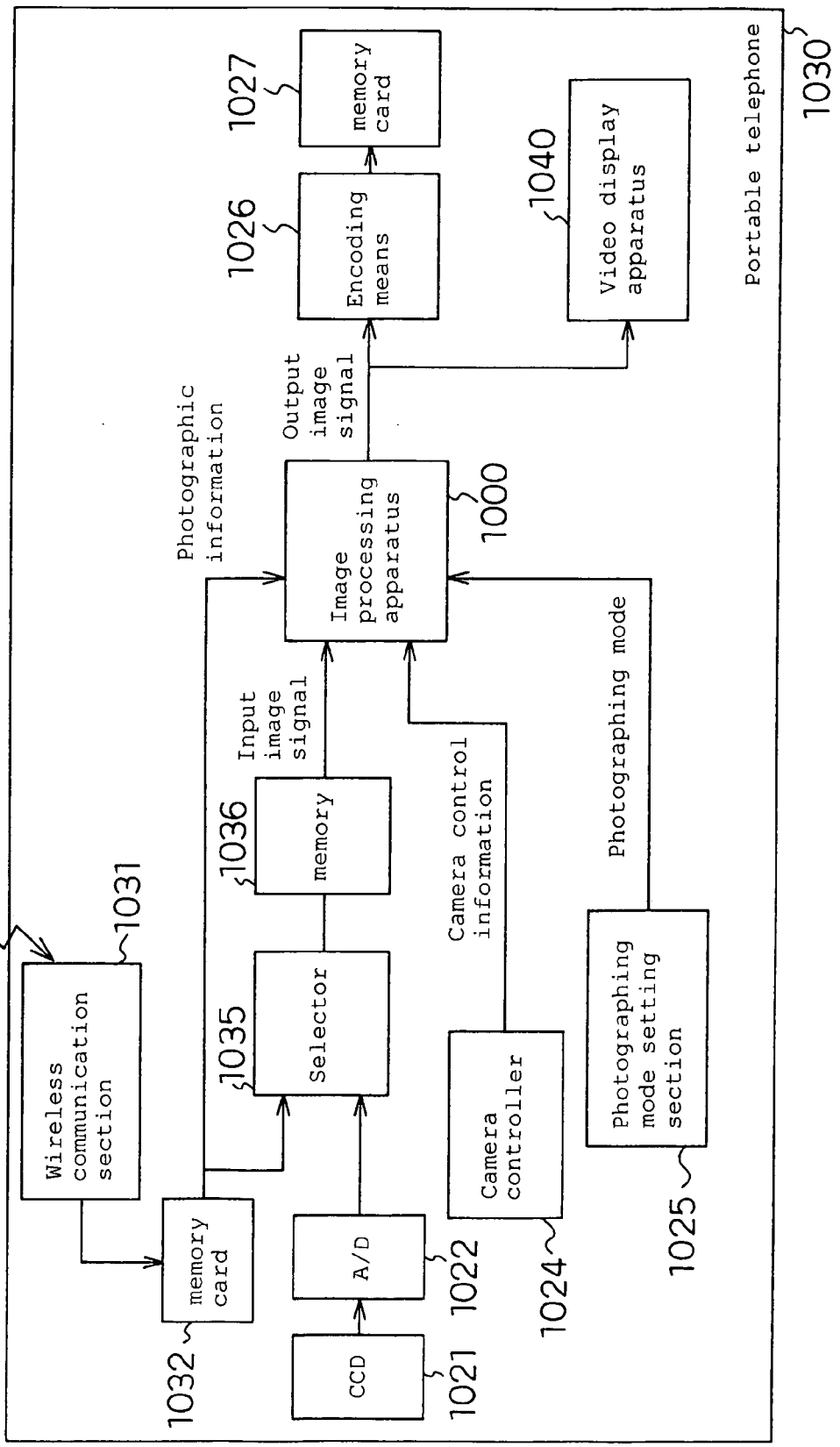
FIG. 17 is a block diagram showing a configuration of a portable telephone in accordance with Embodiment 8 of the present invention.

FIG. 14 shows a printer 1001, FIG. 15 shows a television receiver (or projector) 1010, FIG. 16 shows a video movie camera (or digital camera) 1020, and FIG. 17 shows a portable telephone 1030. In these devices, the image processing apparatuses described in the above-mentioned respective embodiments are incorporated. These devices will be described below.

First, the printer 1001 shown in FIG. 14 will be described.

The printer 1001 is an apparatus of printing input image data transmitted from a personal computer (hereinafter referred to as PC) 1002 on printing media, such as paper media.

The printer 1001 comprises a memory card 800, a memory 900, an image processing apparatus 1000, a PC I/F 1003, a selector 1004, a color conversion means 1006 and a printer head controller 1007.

The memory card 800 and the memory 900 have been described in the above-mentioned embodiments.

In addition, the image processing apparatus 1000 is the image processing apparatus described in either one of the above-mentioned embodiments.

The PC I/F 1003 is an interface through which commands and data, such as image signals, are transmitted between the printer driver, not shown, of the PC 1002 and the printer 1001.

The selector 1004 is a means of carrying out switching as to whether image data is input from the memory card 800 or image data is input from the PC 1002 via the PC I/F 1003.

The color conversion means 1006 is a means of converting output image signals serving as color signals, such as RGB, subjected to memory color correction using the image processing apparatus 1000 into CMY signals serving as print data. Herein, C, M and Y are cyan, magenta and yellow, corresponding to the three primary colors in the printer.

The printer head controller 1007 is a means of controlling the printer head, not shown, of the printer 1001.

Next, the operation of this kind of printer 1001 will be described.

When image data is transmitted from the PC 1002, the PC I/F 1003 receives the transmitted image data and outputs the data to the selector 1004.

The selector 1004 receives the image data transmitted from the PC I/F 1003 and stores the data in the memory 900. In addition, the selector 1004 outputs various pieces of photographic information stored in the header of the image data, for example. As the various pieces of photographic information, the various pieces of photographic information described in the header portion of an image file created using the digital camera are used. In addition, in the case that printing is carried out from the PC 1002, the setting (photo, CG, graph, etc.) of the printer driver of the PC 1002 is also used as photographic information. This setting of the printer driver is also output to the image processing apparatus 1000. The image processing apparatus 1000 obtains a correction degree by also using this kind of information other than pixel signals.

The image processing apparatus 1000 reads an input image signal from the memory 900 and carries out memory color conversion, described in the above-mentioned embodiments, for the input image signal by also using the photographic information output from the selector 1004. When the image processing apparatus 1000 carries out memory color conversion, the correction degree described in the above-mentioned embodiments can be determined by also using the setting information of the printer driver. For example, in the case that the setting of the printer driver is photo, the correction degree obtained in the above-mentioned embodiments is directly used, and in the case of CG or graph, the correction degree is set at 0 or at a smallest value.

The image processing apparatus 1000 outputs an image signal subjected to memory color conversion to the color conversion means 1006 as an output image signal.

The color conversion means 1006 converts the output image signal output from the image processing apparatus 1000 and serving as color signals, such as RGB, into CMY signals serving as print data, and the image signal converted into the CMY signals is printed on printing media using the printer head, not shown, of the printer 1001 under the control of the printer head controller 1007.

Furthermore, in the case that the memory card 800 is mounted on the printer 1001, the selector 1004 reads the image data stored in the memory card 800, stores the data in the memory 900 and outputs various photographic information described in the header portion of an image file created using the digital camera to the image processing apparatus 1000. In the case that the memory card 800 is mounted on the printer 1001, the setting information of the printer driver is not used. Except for this, the subsequent operation is similar to that in the case that image data is transmitted from the PC 1002, and its detailed descriptions are omitted.

As described above, by incorporating the image processing apparatus 1000 in the printer 1001, it is possible to obtain print images subjected to optimum automatic color adjustment according to memory colors.

The printer 1001 in accordance with this embodiment is an example of a printer apparatus in accordance with the present invention, the PC I/F 1003 in accordance with this embodiment is an example of an input means in accordance with the present invention, and the printer head controller 1007 in accordance with this embodiment is an example of a printing means in accordance with the present invention.

Next, the television receiver (or projector) 1010 shown in FIG. 15 will be described. In the case of the television receiver, video data received using the receiving circuit of receiving broadcast waves is input to a video I/F 1011. On the other hand, in the case of the projector, image data transmitted from a PC is input to the video I/F 1011. Although it has been described that the image data transmitted from the PC is input to the video I/F 1011 in the case of the projector, without being limited to this, the image data transmitted from an apparatus other than the PC, such as a video cassette recorder or a DVD player, may also be input to the video I/F 1011.

In addition, in the case of the television receiver, the video display apparatus 1014 thereof comprises a cathode-ray tube, a liquid crystal display apparatus, a plasma display apparatus or the like, and in the case of the projector, it comprises a projection display apparatus or the like.

Other components of the configuration shown in FIG. 15 are common to the television receiver and the projector. Hence, in the subsequent description, the device shown in FIG. 15 is described as the television receiver 1010; however, the subsequent description can also be applied similarly to the projector.

The television receiver 1010 comprises an image processing apparatus 1000, a memory card 800, a memory 900, the video I/F 1011, a selector 1012, a display mode setting means 1013 and the video display apparatus 1014.

The video I/F 1011 is an interface through which such image data as described above is input.

The selector 1012 is a means of reading image data from the memory card 800 or of reading image data from the video I/F 1011.

The display mode setting means 1013 is a means of setting the display mode.

The video display apparatus 1014 is a means of displaying video images.

Next, the operation of this kind of television receiver 1010 will be described.

The display mode setting means 1013 has an operation panel not shown, and the display mode is set by user operation on the operation panel. In the case of moving images, movie, natural, dynamic, etc. are set as the display modes. Furthermore, in the case of still images, photo, presentation, etc. are set. The display mode setting means 1013 outputs the display mode information having been set to the image processing apparatus 1000.

On the other hand, image data transmitted through broadcast waves from a broadcasting station is received using a receiving circuit, not shown, constituting the television receiver 1010 and demodulated. The demodulated image data is output to the video I/F 1011.

In the case that the image data is transmitted from the video I/F 1011, the selector 1012 receives the image data from the video I/F 1011 and stores the image data in the memory 900 once. In addition, the selector 1012 outputs the photographic information held in the header of the image data or the like to the image processing apparatus 1000.

The image processing apparatus 1000 carries out memory color correction as in the case of the above-mentioned printer 1001. When the image processing apparatus 1000 carries out memory color conversion, the correction degree described in the above-mentioned embodiments can be determined by also using the display mode information set using the display mode setting means 1013. For example, in the case of dealing with moving images, the image processing apparatus 1000 sets the correction degree at a small value when the display mode information is movie, or sets the correction degree at a large value when the display mode information is dynamic, or sets the correction degree at an intermediate value between the value for movie and the value for dynamic when the display mode information is natural. Furthermore, in the case of dealing with still images, the image processing apparatus 1000 sets the correction degree at a large value when the display mode information is photo, or sets the correction degree at a small value when the display mode information is presentation.

The image processing apparatus 1000 outputs an image signal subjected to memory color correction to the video display apparatus 1014 as an output image signal. After receiving the output image signal, the video display apparatus 1014 displays them on a liquid crystal display apparatus, for example.

In addition, in the case that the memory card 800 is mounted on the television receiver 1010, the selector 1012 reads image data stored in the memory card 800, stores the data in the memory 900 and outputs the photographic information stored in the header of the image data or the like to the image processing apparatus 1000. Since the subsequent operation is similar to that in the case that the image data is transmitted from the video I/F 1011, its detailed descriptions are omitted.

As described above, by incorporating the image processing apparatus 1000 in the television receiver 1010, it is possible to display moving images and still images subjected to optimum automatic color adjustment according to memory colors.

The television receiver 1010 in accordance with this embodiment is an example of a television receiver in accordance with the present invention; the video display apparatus 1014 in accordance with this embodiment is an example of a display means in accordance with the present invention; the projector 1010 in accordance with this embodiment is an example of a projector in accordance with the present invention; the video I/F 1011 in accordance with this embodiment is an example of the input means in accordance with the present invention; and the video display apparatus 1014 in accordance with this embodiment is an example of a projection means in accordance with the present invention.

Next, the video movie camera (or digital camera) 1020 shown in FIG. 16 will be described. In the case of the video movie camera, photographed moving images are recorded on tape 1028, an optical disc 1029 or the like; however, in some video movie cameras, photographed still images are recorded in the memory card 1027. On the other hand, in the case of the digital still camera, photographed still images are mainly recorded in the memory card 1027.

Other components of the configuration shown in FIG. 16 are common to the video movie camera and the digital camera. Hence, in the subsequent description, the apparatus shown in FIG. 16 is described as the video movie camera 1020; however, the subsequent description can also be applied similarly to the digital camera.

The video movie camera 1020 comprises an image processing apparatus 1000, a CCD 1021, an A/D 1022, a memory 1023, a camera controller 1024, a photographing mode setting section 1025, an encoding means 1026, a memory card 1027, a tape 1028 and an optical disc 1029.

The CCD 1021 is a means of taking images and outputting analog image signals.

The A/D 1022 is a means of converting the analog image signals output from the CCD 1021 into digital image signals.

The memory 1023 is a means of storing image data output from the A/D 1022.

The camera controller 1024 is a means of controlling the camera section including the CCD 1021, photographic optical system, etc.

The photographing mode setting section 1025 is a means of setting photographing modes.

The encoding means 1026 is a means of compressing and encoding image data subjected to memory color conversion using the image processing apparatus 1000.

The memory card 1027 is a means of mainly storing image data of still images.

The tape 1028 is a tape medium of mainly storing image data of moving images.

The optical disc 1029 is an optical storage medium of mainly storing image data of moving images.

Next, the operation of this kind of video movie camera 1020 will be described.

The photographing mode setting means 1025 has a user interface not shown, and the photographing mode is set by user operation on the interface. The photographing mode setting means 1025 outputs the photographing mode information having been set to the image processing apparatus 1000.

On the other hand, the camera controller 1024 controls the camera section including the CCD 1021, the photographic optical system, etc. when the photographing button is pressed.

The CCD 1021 takes images and outputs the images having been taken to the A/D 1022 as electrical signals under the control of the camera controller 1024.

The A/D 1022 converts the analog image signals output from the CCD 1021 into digital signals.

The image data output from the A/D 1022 is stored once in the memory 1023.

The image processing apparatus 1000 reads the image data stored in the memory 1023 and carries out memory color conversion. When the image processing apparatus 1000 carries out memory color conversion, the correction degree described in the above-mentioned embodiments can be determined by also using the photographing mode information having been set using the photographing mode setting section 1025 or the like. In other words, in the image processing apparatus 1000, the correction degree can be obtained as described in the above-mentioned embodiments by also using information based on the user interface of the camera itself, such as strobe light ON/OFF, and camera control information (focus, iris, etc.) as information other than pixel signals.

The image data subjected to memory color conversion using the image processing apparatus 1000 is compressed and encoded using the encoding means 1026 and stored in the memory card 1027, the tape 1028 or the optical disc 1029.

As described above, by incorporating the image processing apparatus 1000 in the video movie camera 1020, it is possible to take images subjected to optimum automatic color adjustment according to memory colors and to store the images on a tape medium. In addition, by incorporating the image processing apparatus 1000 in the digital camera 1020, it is possible to take images subjected to optimum automatic color adjustment according to memory colors and to store the images as files.

The video movie camera 1020 in accordance with this embodiment is an example of a photographing apparatus in accordance with the present invention; the digital camera 1020 in accordance with this embodiment is an example of the photographing apparatus in accordance with the present invention; and the CCD 1021 is an example of a photographing means in accordance with the present invention.

Next, the portable telephone 1030 shown in FIG. 17 will be described.

The portable telephone 1030 comprises an image processing apparatus 1000, a wireless communication section 1031, a memory card 1032, a CCD 1021, an A/D 1022, a selector 1035, a memory 1038, a camera controller 1024, a photographing mode setting section 1025, an encoding means 1026, a memory card 1027 and a video display apparatus 1040.

The wireless communication section 1031 is a circuit having a transmission circuit of outputting transmission waves to an antenna and a receiving circuit of inputting received signals converted into electrical signals using the antenna and of demodulating image data and audio data included in the received signals.

The memory card 1032 is a memory in which the image data received using the wireless communication section 1031 is stored.

The selector 1035 is a means of carrying out switching as to whether the image data stored in the memory card 1032 is input or the image data taken using the CCD 1021 is input via the A/D 1022.

The memory 1036 is a means of temporarily storing the image data output from the selector 1035.

The video display apparatus 1040 is a means of displaying the output image signal subjected to memory color conversion using the image processing apparatus 1000 and comprises a liquid crystal display apparatus or the like.

The CCD 1021, the A/D 1022, the camera controller 1024, the photographing mode setting section 1025, the encoding means 1026 and the memory card 1027 are similar to those of the video movie camera 1020 described referring to FIG. 16.

Although two memory cards, the memory card 1032 and the memory card 1027, are shown in FIG. 17 as memory cards, the memory card 1032 and the memory card 1027 may be the same memory card.

Next, the operation of this kind of portable telephone 1030 will be described.

The receiving circuit, not shown, of the wireless communication section 1031 receives image data attached to e-mail and stores the data in the memory card 1032.

The selector 1035 reads the image data from the memory card 1032 and temporarily stores the data in the memory 1036.

The image processing apparatus 1000 reads the image data temporarily stored in the memory card 1032 and carries out memory color conversion.

The output image signal subjected to memory color conversion using the image processing apparatus 1000 is compressed and encoded using the encoding means 1026 and stored in the memory card 1027. In addition, the output image signal subjected to memory color conversion using the image processing apparatus 1000 is displayed using the video display apparatus 1040, such as a liquid crystal display apparatus.

The operation of subjecting the image data taken using the CCD 1021 to memory color conversion is similar to that of the video movie camera 1020 shown in FIG. 16, and its description is omitted.

When the image processing apparatus 1000 of the portable telephone 1030 carries out memory color conversion, the correction degree can be obtained by using various photographic information described in the header of an image file transmitted so as to be attached to e-mail or the like, or information based on the camera user interface of the photographing mode setting section 1025 and camera control information (focus, iris, etc.) as information other than pixel signals.

As described above, by incorporating the image processing apparatus 1000 in the portable telephone 1030, it is possible to display images subjected to optimum automatic color adjustment according to memory colors on a compact display or to store them in the memory card.

The portable telephone 1030 in accordance with this embodiment is an example of a mobile communication terminal in accordance with the present invention; the wireless communication section 1031 in accordance with this embodiment is an example of a wireless communication circuit in accordance with the present invention; and the video display apparatus 1040 in accordance with this embodiment is an example of the display means in accordance with the present invention.

The program of the present invention is a program that carries out the functions of all or part of the means (or apparatuses, devices, etc.) of the above-mentioned image processing apparatus of the present invention using a computer and operates in cooperation with the computer.

Still further, the recording medium of the present invention is a recording medium having a program that carries out all or part of the functions of all or part of the means (or apparatuses, devices, etc.) of the above-mentioned image processing apparatus of the present invention using a computer, the medium is readable using the computer, and the above-mentioned program having been read from the recording medium is used to carry out the above-mentioned functions in cooperation with the above-mentioned computer.

Still further, the above-mentioned "part of the means (or apparatuses, devices, etc.)" of the present invention is one or several means in the multiple means thereof.

Still further, the above-mentioned "the functions of the means (or apparatuses, devices, etc.)" of the present invention are all or part of the functions of the above-mentioned means.

Still further, one utilization form of the program of the present invention may be an embodiment that is recorded on a recording medium readable by a computer and operates in cooperation with the computer.

Still further, another utilization form of the program of the present invention may be an embodiment that is transmitted through a transmission medium, is read by a computer and operates in cooperation with the computer.

Still further, the recording medium includes ROM and the like, and the transmission medium includes a transmission medium, such as the Internet, light, electric wave, sound wave, etc.

Still further, the above-mentioned computer of the present invention is not limited to pure hardware, such as a CPU, but may include firmware, OS and peripheral devices.

Still further, as described above, the configuration of the present invention may be attained by software or by hardware.

As described above, in accordance with the present invention, it is possible to eliminate influence to objects other than the target subjected to memory color correction, and to reduce influence to the other objects in a memory color region while the continuity of gradation in the directions of luminance, saturation and hue in the memory color region and the boundary between the inside and outside of the memory color region is maintained. Furthermore, memory color correction having very few side effects can be attained by changing the correction degree depending on whether an image requires memory color correction or not, whereby memory color correction operating fully automatically without requiring the user to carry out judgment and setting can be attained.

As being clarified by the above descriptions, the present invention can provide an image processing apparatus, an image processing method, a program, a program recording medium, a digital camera, a digital camcorder, a television receiver, a printer and a mobile communication terminal not causing a side effect of correcting colors that should not be subjected to memory color correction essentially.

Furthermore, the present invention can provide an image processing apparatus, an image processing method, a program, a program recording medium, a digital camera, a digital camcorder, a television receiver, a printer and a mobile communication terminal capable of avoiding correcting other objects included in the memory color region that should be corrected essentially but accidentally having colors close to the color to be corrected.

Still further, the present invention can provide an image processing apparatus, an image processing method, a program, a program recording medium, a digital camera, a digital camcorder, a television receiver, a printer and a mobile communication terminal not making gradation discontinuous and not causing color jumping.

The invention claimed is:

1. An image processing apparatus of correcting the color of a predetermined range of a pixel signal for each pixel included in an input image signal, comprising:
    a target color setting unit which sets a target color depending on which the color of said pixel signal is corrected, and
    a color converter which carries out correction to make the color of said pixel signal coincident with or close to said target color by using a) said pixel signal, b) information of identifying a photographic scene by also using photographic information, and c) said target color, wherein said color converter comprises:
    an intensity determination unit which generates a correction intensity that is smaller on a periphery of a color region and larger in a vicinity of a central portion of said color region, said color region having a specific range set on the basis of two chromaticity components excluding a luminance component in the color of said pixel signal,
    a correction degree setting unit which sets a correction degree by using a) said pixel signal, b) said information of identifying said photographic scene, and c) said target color, and
    a correction unit which makes the color of said pixel signal coincident with or close to said target color depending on said correction intensity having been generated and said correction degree having been set, wherein
    said correction degree setting unit sets said correction degree by identifying at least an image photographing scene according to said input image signal.

2. The image processing apparatus in accordance with claim 1, wherein said correction degree setting unit determines said correction degree according to said input image signal and photographic information at the time when an input image is taken.

3. The image processing apparatus in accordance with claim 2, wherein said correction degree setting unit comprises:
    an image identifier which identifies the photographic scene of an image according to said input image signal,
    a photographic information identifier which identifies a photographic scene according to the photographic information at the time when said input image signal is photographed, and
    a correction degree determination unit which determines said correction degree according to the outputs of said image identifier and said photographic information identifier.

4. The image processing apparatus in accordance with claim 3, wherein said image identifier and said photographic information identifier identify whether a person is included in an image or not.

5. The image processing apparatus in accordance with claim 3, wherein said image identifier and said photographic information identifier identify whether the sky is included in an image or not.

6. The image processing apparatus in accordance with claim 3, wherein said image identifier and said photographic information identifier identify whether green plants are included in an image or not.

7. An image processing apparatus of correcting the color of a predetermined range of a pixel signal for each pixel included in an input image signal, comprising:
    a target color setting unit which sets a target color depending on which the color of said pixel signal is corrected, and
    a color converter which carries out correction to make the color of said pixel signal coincident with or close to said target color by using a) the luminance component in the color of said pixel signal, b) two chromaticity components excluding said luminance component in the color of said pixel signal, and c) said target value, wherein
    said color converter determines said correction degree by using not only said two chromaticity components of said pixel signal to be corrected but also said luminance component of said pixel signal to be corrected and, wherein
    said color converter comprises:
    an intensity determination unit which generates a correction intensity that is smaller on a periphery of a color region and larger in a vicinity of a central portion of said color region, said color region having a specific range set on the basis of the luminance component and the two chromaticity components excluding said luminance component in the color of said pixel signal, and
    a correction unit which makes the color of said pixel signal coincident with or close to said target color depending on said correction intensity having been generated.

8. An image processing apparatus in accordance with claim 7, wherein said intensity determination unit comprises:
    a first function generator which outputs a candidate of a first correction intensity for said luminance signal,
    second and third function generators which output candidates of second and third correction intensities for said two chromaticity components, respectively, and a synthesizer which synthesizes the candidates of said first, second and third correction intensities and outputs the result as said correction intensity.

9. The image processing apparatus in accordance with claim 7, wherein said intensity determination unit comprises:
a first function generator which outputs a candidate of a first correction intensity for said luminance signal,
a two-dimensional function generator which outputs a second correction intensity on the basis of a two-dimensional function typified by an ellipse using said two chromaticity components, and
a synthesizer which synthesizes the candidates of said first and second correction intensities and outputs the result as said correction intensity.

10. The image processing apparatus in accordance with claim 7, wherein said intensity determination unit comprises:
a first function generator which outputs a candidate of a first correction intensity for said luminance signal,
a first polar coordinate converter which converts said two chromaticity components into a hue signal and a saturation signal,
a second function generator which generates a candidate of a second correction intensity for said hue signal,
a third function generator which generates a candidate of a third correction intensity for said saturation signal, and
a synthesizer which synthesizes the candidates of said first, second and third correction intensities and outputs the result as said correction intensity.

11. The image processing apparatus in accordance with claim 1 or 7, wherein said correction unit corrects each of said two chromaticity components to a value obtained when each of said two chromaticity components and two target chromaticity values output from said target color setting unit are internally divided depending on said correction intensity.

12. The image processing apparatus in accordance with claims 1 or 7, wherein
said correction unit has a second polar coordinate converter which converts said two chromaticity components into a hue signal and a saturation signal and said saturation signal output from said second polar coordinate converter being converted to a value obtained when said hue signal and said saturation signal and the target hue signal and the target saturation signal output from said target color setting unit are internally divided depending on said correction intensity.

13. The image processing apparatus in accordance with claim 1 or 7, wherein
said intensity determination unit outputs a hue correction intensity for hue correction and a saturation correction intensity for saturation correction,
said correction unit has a second polar coordinate converter which converts said two chromaticity components into a hue signal and a saturation signal,
a hue correction unit which corrects said hue signal having been converted to a value obtained when said hue signal and the target hue value output from said target color setting unit are internally divided depending on said hue correction intensity, and
a saturation correction unit which corrects said saturation signal having been converted to a value obtained when said saturation signal and the target saturation value output from said target color setting unit are internally divided depending on said saturation correction intensity.

14. An image processing apparatus of correcting the color of a predetermined range of a pixel signal for each pixel included in an input image signal, comprising:

a target color setting unit which sets a target color depending on which the color of said pixel signal is corrected,
a color converter which carries out correction to make the color of said pixel signal coincident with or close to said target color by using a) said pixel signal, b) photographic information, and c) said target color, and
an interpolator which interpolates a three-dimensional look-up table of using three input signals as addresses and outputs three output signals or interpolates two of said three-dimensional look-up tables, wherein
the correspondence relationship of making the color of said pixel signal to correspond to the color corrected using said color converter is stored in said three-dimensional look-up table in advance, and
the color of said each pixel signal is corrected using said three-dimensional look-up table.

15. An image processing apparatus of correcting the color of a predetermined range of a pixel signal for each pixel included in an input image signal, comprising:
a target color setting unit which sets a target color depending on which the color of said pixel signal is corrected,
a color converter which carries out correction to make the color of said pixel signal coincident with or close to said target color by using a) the luminance component in the color of said pixel signal, b) two chromaticity components excluding said luminance component in the color of said pixel signal, and c) said target value, and
an interpolator which interpolates a three-dimensional look-up table of using three input signals as addresses and outputs three output signals or interpolates two of said three-dimensional look-up tables, wherein
said color converter determines said correction degree by using not only said two chromaticity components of said pixel signal to be corrected but also said luminance component of said pixel signal to be corrected,
the correspondence relationship of making the color of said pixel signal to correspond to the color corrected using said color converter is stored in said three-dimensional look-up table in advance, and
the color of said each pixel signal is corrected using said three-dimensional look-up table.

16. An image processing apparatus of correcting the color of a predetermined range of a pixel signal for each pixel included in an input image signal, comprising:
a target color setting unit which sets a target color depending on which the color of said pixel signal is corrected,
an intensity determination unit which generates a correction intensity on the basis of at least one chromaticity component,
among the luminance component and the two chromaticity components in the color of said pixel signal, a photographic image information identifier which identifies whether an object as a target of a correction of color is included or not for each input image, the photographic image information identifier identifying according to photographic information at the time when the input image is taken,
a correction degree determination unit which determines a correction degree for each input image, according to the output of said photographic image information identifier and
a correction unit which corrects the color of said pixel signal according to said correction intensity generated for each pixel and said correction degree determined for each input image, wherein said correction unit performs a correction of said color of said pixel signal so that a difference between said target color and said color becomes smaller after the correction than before the correction.

17. The image processing apparatus according to claim 16, wherein
said photographic image information identifier identifies, according to a distance to object(s) of said photographic information, as to whether a person who is able to be considered as a primary object based on its size is included or not in said input image.

18. The image processing apparatus according to claim 17, wherein
said photographic image information identifier identifies the person who is able to be considered as the primary object based on its size is not included in said input image in the case that the distance to said object(s) is a distance of macro view or a distance of distant view.

19. The image processing apparatus according to claim 16, wherein
said photographic image information identifier identifies, according to an information of said photographic information regarding flash light, a person who is able to be considered as a primary object based on its size is not included in said input image in the case that the flash light is emitted and its returned light is not detected.

20. The image processing apparatus according to claim 19, wherein
the detection of said returned light is performed so as to be judged that said returned light was not detected when the luminance at a central portion in said image was not relatively high.

21. The image processing apparatus according to claim 19, wherein
the detection/non-detection of said returned light is judged according to the information recorded in said photographic information.

22. The image processing apparatus according to claim 19, where
said photographic image information identifier identifies, according to an information of said photographic information regarding a light source, as to whether a sky is to be included or not in said input image.

23. The image processing apparatus according to claim 22, wherein
said photographic image information identifier identifies the sky is not included in said input image in the case that said information regarding the light source indicates said light source is an indoor light.

24. The image processing apparatus according to claim 16, wherein
said photographic image information identifier identifies, according to a photographing time of said photographic information, as to whether a sky is to be included or not in said input image.

25. The image processing apparatus according to claim 16, wherein
said photographic image information identifier identifies, according to an estimated brightness of the object, that a sky is not included in said input image in the case that the estimated brightness is lower than a predetermined value, and
the estimated brightness is estimated according to a shutter speed and a aperture value both of which are included in said photographic information.

26. The image processing apparatus according to claim 16, wherein
said photographic image information identifier identifies, according to a photographic scene information of said photographic information, as to whether a person is included or not in said input image.

* * * * *